US009525331B2

(12) United States Patent
Mukai

(10) Patent No.: US 9,525,331 B2
(45) Date of Patent: Dec. 20, 2016

(54) LINEAR MOTOR AND LINEAR CONVEYANCE DEVICE

(71) Applicant: YAMAHA HATSUDOKI KABUSHIKI KAISHA, Shizuoka-ken (JP)

(72) Inventor: Masayuki Mukai, Shizuoka-ken (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 420 days.

(21) Appl. No.: 14/355,805

(22) PCT Filed: Oct. 9, 2012

(86) PCT No.: PCT/JP2012/006458
§ 371 (c)(1),
(2) Date: May 1, 2014

(87) PCT Pub. No.: WO2013/065236
PCT Pub. Date: May 10, 2013

(65) Prior Publication Data
US 2014/0292112 A1    Oct. 2, 2014

(30) Foreign Application Priority Data
Nov. 4, 2011    (JP) ................. 2011-242058

(51) Int. Cl.
*H02K 41/02*    (2006.01)
*H02K 41/00*    (2006.01)
*H02K 41/03*    (2006.01)

(52) U.S. Cl.
CPC ........... *H02K 41/031* (2013.01); *H02K 11/215* (2016.01)

(58) Field of Classification Search
CPC .................................. H02K 41/00; F16C 32/04
(Continued)

(56) References Cited

U.S. PATENT DOCUMENTS 5,565,718 A    10/1996  Takei
6,100,681 A *  8/2000  Tsuruta ................. F16C 29/008
                                              310/12.19

(Continued)

FOREIGN PATENT DOCUMENTS

CN    101771327 A    7/2010
CN    101850523 A    10/2010
(Continued)

OTHER PUBLICATIONS

International Search Report; PCT/JP2012/006458; Dec. 25, 2012.
(Continued)

*Primary Examiner* — Jose Gonzalez Quinones
(74) *Attorney, Agent, or Firm* — Studebaker & Brackett PC

(57) ABSTRACT

A linear motor is equipped with sensor substrates that are attached to main motor bodies in the X-direction along a conveyance path in such a manner that the sensor substrates are accommodated within the dimensions of the main motor bodies. Each sensor substrate is equipped with a sensor for outputting an A-phase position detection signal upon detecting a slider, a sensor for outputting a B-phase position detection signal, and a position detection signal summer unit. Each position detection signal summer unit adds up, for A-phase and for B-phase, position detection signals that are output from the position detections unit of the adjoining substrates provided on either side of the relevant substrate.

16 Claims, 7 Drawing Sheets

(58) Field of Classification Search
USPC ...... 310/12.01, 12.05, 12.06, 12.09; 318/687
See application file for complete search history.

(56) References Cited

U.S. PATENT DOCUMENTS

| | | | |
|---|---|---|---|
| 2001/0048249 A1 | 12/2001 | Tsuboi et al. | |
| 2009/0288931 A1 | 11/2009 | Oshima | |
| 2011/0050007 A1* | 3/2011 | Kubo | ........................ H02P 3/24 |
| | | | 310/12.19 |
| 2011/0109252 A1* | 5/2011 | Takagi | ................. H02K 11/215 |
| | | | 318/135 |

FOREIGN PATENT DOCUMENTS

| JP | 61-178726 U | 11/1986 |
|---|---|---|
| JP | 06-311723 A | 11/1994 |
| JP | 11-051693 A | 2/1999 |
| JP | 2001-352744 A | 12/2001 |
| JP | 2003-244929 A | 8/2003 |
| JP | 2005-143171 A | 6/2005 |
| JP | 2009-089460 A | 4/2009 |
| JP | 2011-101552 A | 5/2011 |
| WO | 2008/072525 A1 | 6/2008 |
| WO | 2009/075171 A1 | 6/2009 |

OTHER PUBLICATIONS

An Office Action issued by the Korean Patent Office on Sep. 11, 2015, which corresponds to Korean Patent Application No. 10-2014-7014801 and is related to U.S. Appl. No. 14/355,805; with English language summary.

The Extended European search report issued by the European Patent Office on Sep. 30, 2016, which corresponds to European Patent Application No. 12846037.5-1808 and is related to U.S. Appl. No. 14/355,805.

* cited by examiner

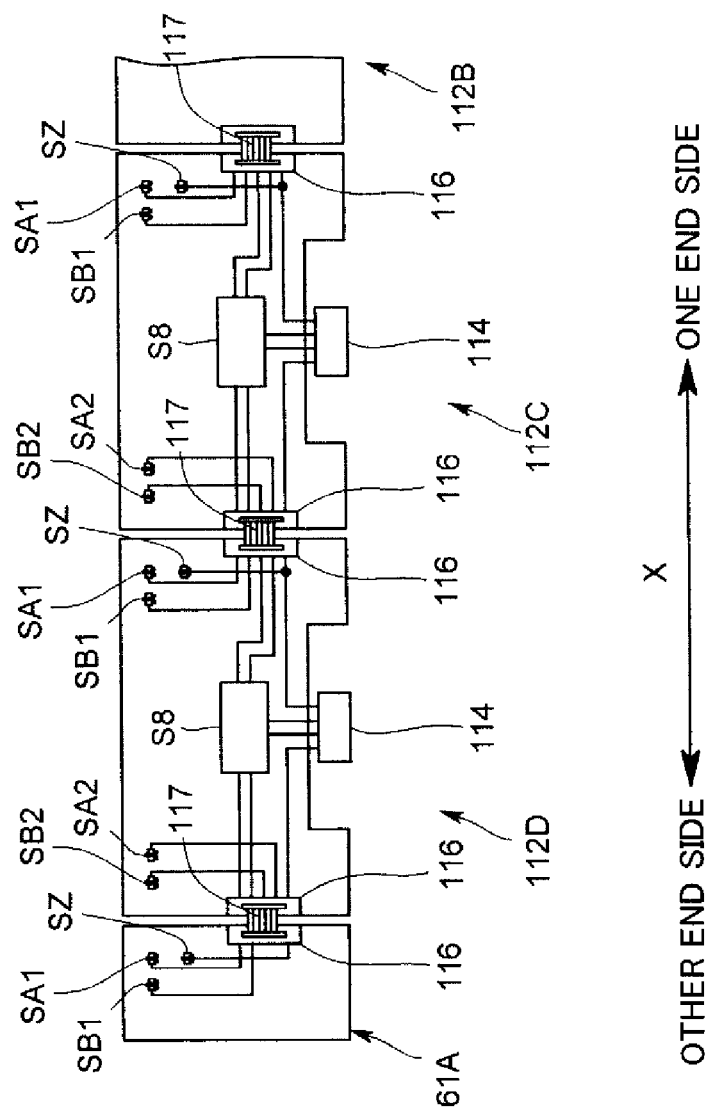

LINEAR MOTOR AND LINEAR CONVEYANCE DEVICE

CROSS REFERENCE TO RELATED APPLICATIONS

This application claims benefit of priority to Japanese Patent Application No. 2011-242058 filed on Nov. 4, 2011, and to International Patent Application No. PCT/JP2012/006458 filed on Oct. 9, 2012, the entire content of each of which is incorporated herein by reference.

TECHNICAL FIELD

The present disclosure relates to a linear motor and a linear conveyance device.

BACKGROUND

A linear motor comprises a motor body in which a stator is disposed, a mover that faces the stator, and a slider in which the mover is disposed. The slider moves relative to the motor body along a predetermined moving path. One of the stator and the mover may be constituted by a plurality of permanent magnets and the other may be constituted by an electromagnet. Otherwise, both the stator and the mover may be constituted by an electromagnet. When permanent magnets are used, the respective permanent magnets are arranged along the moving path so that different magnetic polarities appear alternately. Moreover, the electromagnet comprises a plurality of cores arranged along the moving path. A coil is attached to each core. Moreover, the linear motor comprises a control device. The control device controls conduction of the coils and causes the slider to move along the moving path while generating attractive force between the stators.

In order to detect the position of the slider, a linear scale is provided in the linear motor. For example, in the device disclosed in Japanese Patent Laid-open Publication No. 2003-244929, a linear scale is attached to a slider. The device of Japanese Patent Laid-open Publication No. 2003-244929 further comprises a position detection sensor that detects the linear scale to output a wave signal, an origin sensor that outputs a signal for specifying an origin position of the wave signal, and a sensor substrate for attaching the origin sensor to a motor body. The position detection sensor and the origin sensor output signals according to a moving position of the slider, and the position of the slider is detected based on these signals.

However, the sensor substrate of Japanese Patent Laid-open Publication No. 2003-244929 is disposed in a central portion of the stator attached to the motor body in a direction along the moving path. Moreover, the sensors are also laid out in the central portion of the stator. For this reason, there is a problem in that it is not possible to detect the position until the linear scale of the slider reaches the origin sensor disposed in the central portion of the stator. Therefore, as disclosed in Japanese Patent Laid-open Publication No. 2011-101552, the present applicant proposes a linear motor in which an origin sensor is disposed at a position where the origin sensor meets an end of a stator in the direction along a moving path. The linear motor employs a stator unit that comprises a motor body and stators mounted on the motor body. One or more stator units are connected along the moving path to form a linear motor together with a slider that has a mover. The stator unit comprises a sensor head, as a sensor substrate, for each stator. In the sensor head, an origin sensor is disposed at a position where the origin sensor meets an end of the stator in the direction along the moving path.

SUMMARY

In the configuration of Japanese Patent Laid-open Publication No. 2011-101552, it is possible to obtain origin information immediately at a point in time when the linear scale of the slider starts moving from a certain stator unit among the plurality of stator units to another stator unit adjacent to the stator unit. For this reason, it is possible to detect the position of the slider in a relatively long stroke range. However, in order to dispose the origin sensor at the position where the origin sensor meets the end of the stator in the direction along the moving path, it is necessary to cause the sensor head to be offset relative to the stator unit in the direction along the moving path so that the origin sensor is physically supported. For this reason, a state in which the sensor head protrudes from the end of the stator unit in the direction along the moving path is created. As a result, when the motor body is constituted by one stator unit, it is necessary to protect the protruding portion of the sensor head. Thus, it may be difficult to handle the linear motor. Moreover, when a plurality of stator units are connected to a base, it is necessary to disassemble the stator unit itself. That is, it is necessary to separate the sensor head from the stator unit, install the motor body of the stator unit, and then attach the sensor head to the installed motor body again. For this reason, the operation of connecting the stator units or disassembling the linear motor may become complicated.

The present disclosure has been made in view of the above problems, and an object of the present disclosure is to provide a linear motor having easy handling properties while maintaining the function of detecting the position of a slider in a relatively long stroke range. Another object of the present disclosure is to provide a linear conveyance device configured such that a conveying article can be mounted on a slider of the linear motor and to provide a linear conveyance device in which linear motors are connected in a loop so as to circulate the slider configured to mount the conveying article thereon.

In order to solve the problems, according to an aspect of the present disclosure, there is provided a linear motor comprising: a slider having a mover; a motor body disposed in a moving path of the slider; and stators attached to the motor body, these stators are arranged along the moving path so that the stators face the mover and move the slider along the moving path while generating attractive force between the stators.

Each stator unit comprises: a plurality of sensor substrates attached to the respective stators such that the plurality of sensor substrates is sized within a dimension of the respective stators in a moving direction extending along the moving path; an upstream-side position detecting unit attached to each sensor substrate, the upstream-side position detecting unit being configured to detect the slider in an upstream portion of each sensor substrate in the moving direction and output a position detection signal; a downstream-side position detecting unit attached to each sensor substrate, the downstream-side position detecting unit being configured to detect the slider in a downstream portion of each sensor substrate in the moving direction and output a position detection signal; a position detection signal adding unit attached to each sensor substrate, the position detection signal adding unit being configured to add the position detection signal from the downstream-side position detecting unit of a sensor substrate being adjacent to an upstream side of one sensor substrate in the moving direction and the position detection signal from the upstream-side position detecting unit of a sensor substrate adjacent to a downstream side of the one sensor substrate in the moving direction to obtain an addition signal, and the position detection signal adding unit being capable of outputting the addition signal; and a control device configured to detect a position of the slider relative to one stator to which the one sensor substrate is attached, based on the additional signal from the position detection signal adding unit.

According to another aspect of the present disclosure, there is provided a linear conveyance device in which the linear motor is configured to allow a conveying article to be mounted on the slider.

The present disclosure provides a significant advantageous effect that a function of detecting the position of the slider in a longer stroke range than the stator can be provided and a device having easy handling properties can be provided.

Additional features, objects, configurations, and operational advantages of the present disclosure will become more apparent upon reading the following detailed description along with the accompanying drawings.

BRIEF DESCRIPTION OF THE DRAWINGS

FIG. 7 is a circuit diagram illustrating a circuit configuration of a plurality of sensor substrates and sensor portions on the other end side according to the embodiment of FIG. 1.

DETAILED DESCRIPTION

Hereinafter, best modes for carrying out the present disclosure will be described with reference to the accompanying drawings.

Figure 1:
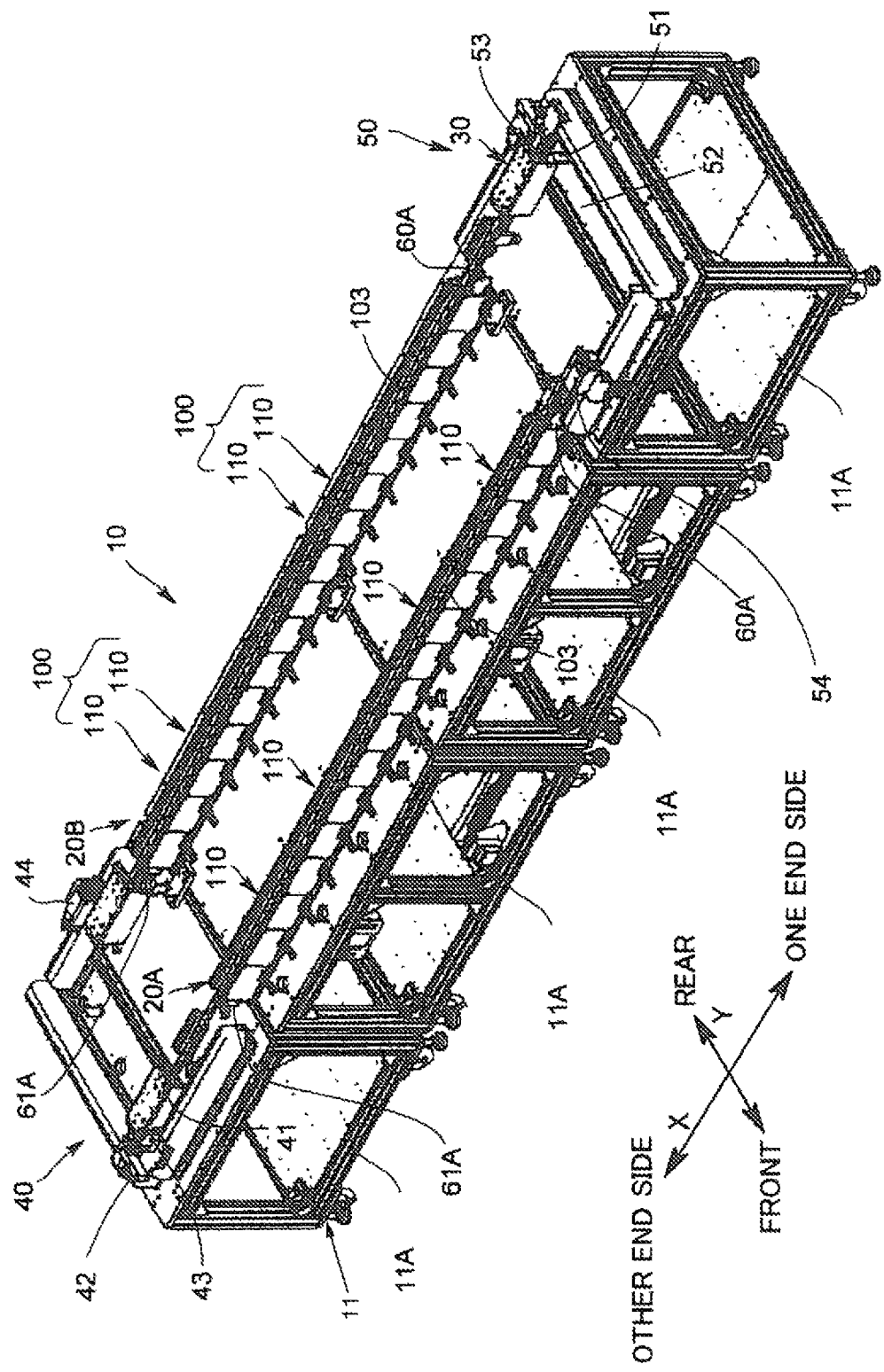
FIG. 1 is a perspective view illustrating an entire configuration of a linear conveyance device according to an embodiment of the present disclosure.

First, with reference to FIG. 1, a linear conveyance device 10 according to the embodiment of the present disclosure comprises a base 11 that extends in a rectangular form in a plan view, a pair of linear driving units 20A and 20B formed on the base 11, and a slider 30 driven by the linear driving units 20A and 20B. In the present embodiment, a first circulating device 40 that circulates the slider 30 from a downstream end of one linear driving unit 20A (on the forward moving side) to an upstream end of the other linear driving unit 20B (on the backward moving side) and a second circulating device 50 that circulates the slider 30 from the downstream end of the other linear driving unit 20B to the upstream end of one linear driving unit 20A are provided.

The base 11 is formed by combining a plurality of tables 11A. Each table 11A is formed by forming a rectangular parallelepiped frame as a framework. Each table 11A comprises a bottom plate, height-adjustable legs attached to four corners of the lower surface of the bottom plate, and a ceiling plate provided above the legs as the framework. In the following description, a longitudinal direction of the base 11 is referred to as an X-direction, and a horizontal direction orthogonal to the X-direction is referred to as a Y-direction. Also, one end side (the left side of FIG. 3) of the Y-direction is referred to as a front side. Moreover, the right side of FIG. 4 is referred to as one end (the downstream end of the linear driving unit 20A and the upstream end of the linear driving unit 20B), and the left side is referred to as the other end (the upstream end of the linear driving unit 20A and the downstream end of the linear driving unit 20B).

The linear driving units 20A and 20B extend in parallel on the base 11 along the X-direction. The front linear driving unit 20A (on the front side of FIG. 1) forms a forward path (moving path) along which the slider 30 is driven from one end side in the X-direction to the other end side. The rear linear driving unit 20B (on the rear side of FIG. 1) forms a backward path (moving path) along which the slider 30 is driven from the other end side in the X-direction to one end side. In the present embodiment, these linear driving units 20A and 20B form linear motors. Each of the linear motors (the linear driving units 20A and 20B) comprises a plurality of stator units 100 and a rail 103. The stator units 100 have the same specifications and are arranged along the X-direction. The rail 103 is fixed to the upper portion of the plurality of stator units 100 along the X-direction.

Hereinafter, the stator units 100 of the linear driving unit 20A will be described.

Figure 2:
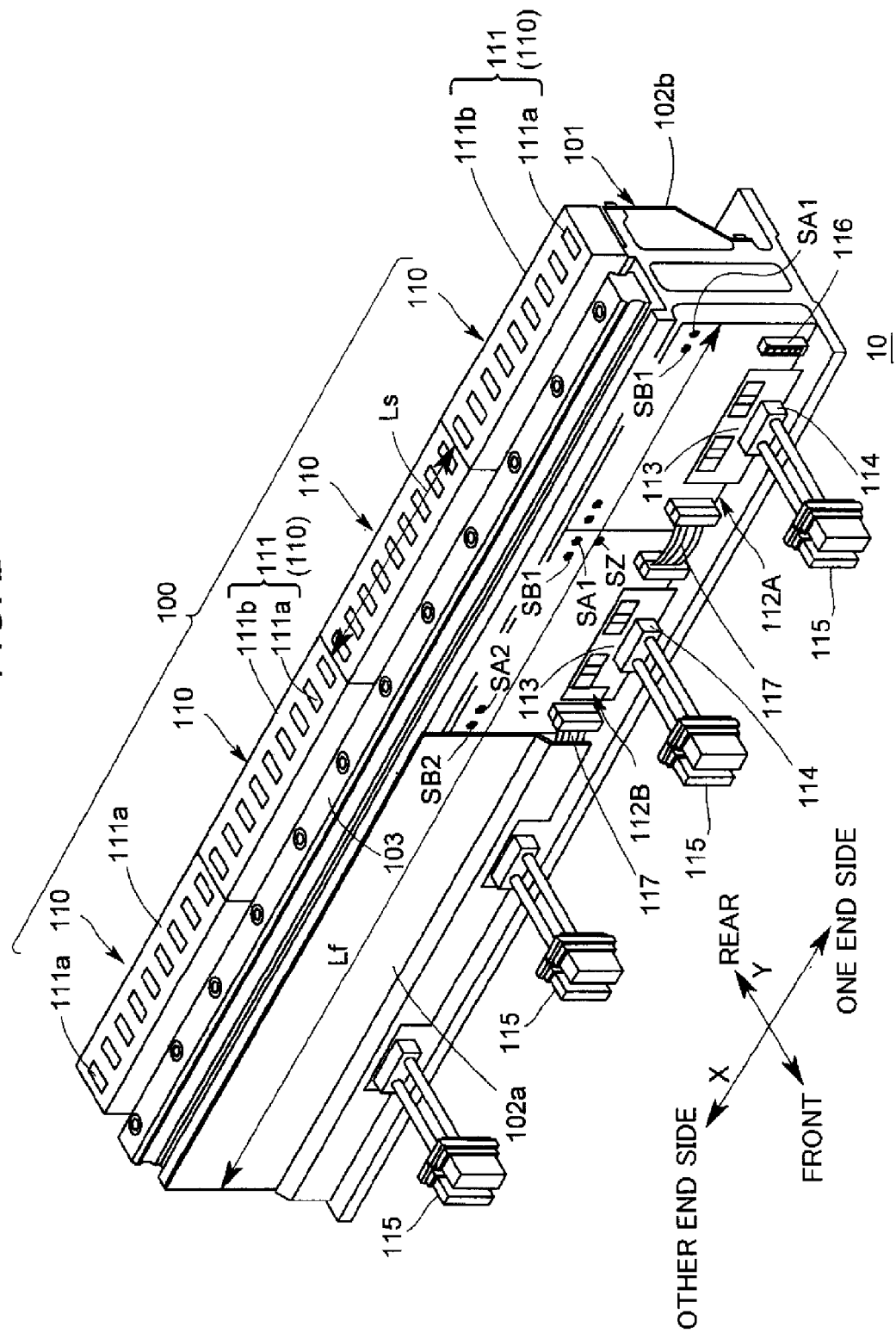
FIG. 2 is a perspective view illustrating a main part of a stator unit according to the embodiment of FIG. 1.
Figure 3:
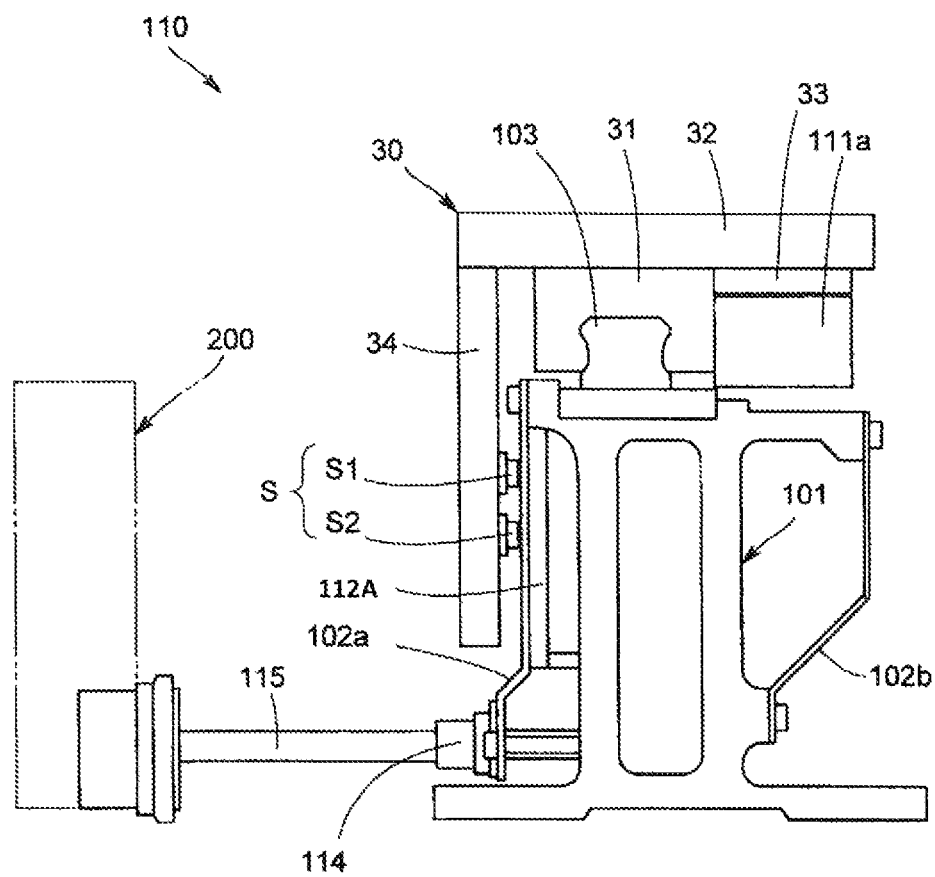
FIG. 3 is a schematic side view of the stator unit according to the embodiment of FIG. 1.
Figure 4:
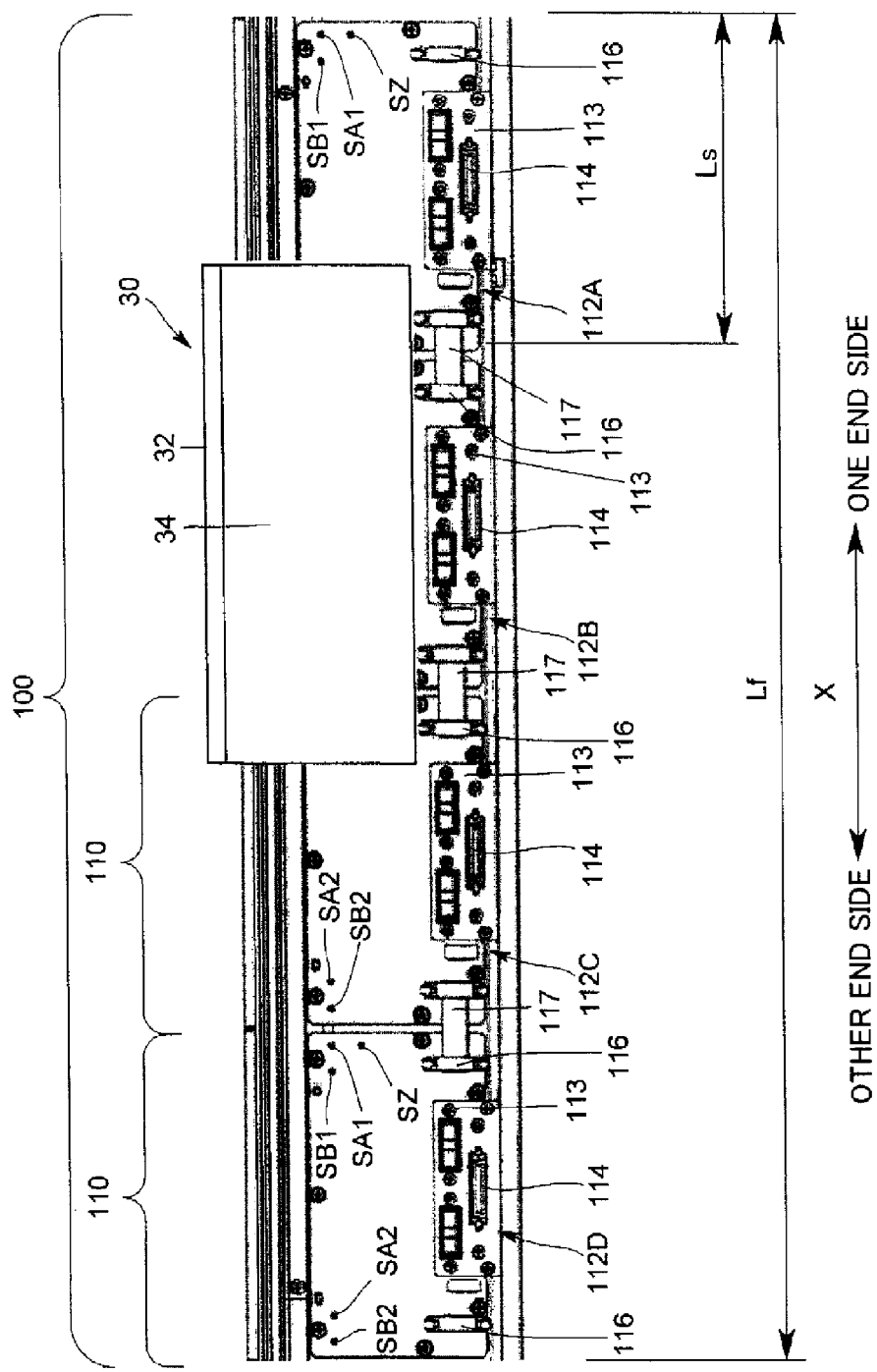
FIG. 4 is a front view when two stator units according to the embodiment of FIG. 1 are connected.

Referring to FIGS. 2 to 4, each stator unit 100 is a device in which a set of four stators 110 having approximately the same specifications is connected. The stator unit 100 comprises a unit frame 101. The unit frame 101 is formed into a rectangular shape in a plan view and is disposed so that the longitudinal direction thereof extends in the X-direction. The unit frame 101 is fixed to an upper surface of the base 11 by bolts (not illustrated). In the present embodiment, the unit frame 101 is an example of a member that constitutes a motor body of each stator unit 100. In the illustrated embodiment, covers 102a (see FIG. 3) and 102b are attached to both front and rear sides of each unit frame 101.

A set of four stators 110 is assembled to the upper portion of the unit frame 101. The stators 110 are arranged in parallel to the rail 103 on the rear side of the rail 103.

Each stator 110 is constituted by a plurality of magnetic electromagnets 111. The magnetic electromagnet 111 comprises a core 111a. The cores 111a are arranged in a line in the X-direction. The upper ends of the cores 111a are magnetic polarities and the lower ends are connected to an adjacent core 111a to form an interdigital shape. A magnetic coil is wound around the core. Reference numeral 111b is an assembly of magnetic coils. The magnetic coil assembly 111b is arranged in the longitudinal direction of the unit frame 101. In the illustrated example, a length Ls in the X-direction (the direction along the moving path) of the stator 110 is set to exactly ¼ of a length Lf in the X-direction of the unit frame 101. On the other hand, as illustrated in FIG. 2, four stators 110 are arranged in the longitudinal direction on the upper surface of the unit frame 101. As a result, when the unit frame 101 is arranged in the X-direction, the stators 110 are connected linearly at an equal pitch along the X-direction. Moreover, the length Ls in the X-direction of the stator 110, the length L in the X-direction of the unit frame 101, and a magnetic polarity pitch are set so that a distance (magnetic polarity pitch) between the cores 111a adjacent at the end of the stator 110 is the same as a distance between the cores 111a adjacent in an intermediate point of the stator 110.

The stator unit 100 comprises a controller 200 (schematically illustrated in FIG. 3) that is provided in each stator 110.

The controller 200 is constituted by a microprocessor and other electronic components and the like. The controllers 200 obtain the positions of the slider 30 relative to the corresponding stators 110 and individually control conduction of the respective magnetic coils of the corresponding stators 110 so as to correspond to the obtained positions. The controllers 200 are configured to control the current supplied to the corresponding stators 110 based on a program or the control of a main control device that controls the entire linear conveyance device. Moreover, each controller 200 is configured to be able to communicate with each other.

Referring to FIG. 4, four substrates 112A, 112B, 112C, and 112D are attached to the front side in the Y-direction of the unit frame 101 so as to correspond to the four stators 110 comprised in the unit frame 101. Plates 113 are attached to the respective substrates 112A, 112B, 112C, and 112D. A connector 114 is disposed on the plate 113. A wire harness 115 for realizing wire connection to an external device is connected to the connector 114. The wire harness 115 is disposed so as to extend toward the front side in the Y-direction of the unit frame 101 (see FIG. 3).

The length in the X-direction of the substrates 112A, 112B, 112C, and 112D is set to be approximately the same as the length Ls of the stator 110. The substrates 112A, 112B, 112C, and 112D are arranged in the X-direction at the same arrangement pitch as the stators 110. Thus, all substrates 112A, 112B, 112C, and 112D fit within the front surface of the unit frame 101 (that is, the substrates do not protrude from the front surface). Moreover, the arrangement pitch in the X-direction of the substrate 112A attached to one end side of the unit frame 101 and the substrate 112D attached to the other end side of another unit frame 101 being adjacent to one end side of the substrate 112A is set to be the same as the arrangement pitch (or the arrangement pitch of the substrates 112C and 112D) of the substrates 112A and 112B attached to the unit frame 101.

The connector 114 disposed on the plate 113 is electrically connected to the stator 110 corresponding to the substrate 112A (112B, 112C, or 112D) of the plate 113, sensors disposed on the substrate 112A (112B, 112C, or 112D) of the plate 113, and an adder circuit S8 described later. The wire harness 115 is connected to the connector 114. Thus, the wire harness 115 electrically connects the corresponding stator 110 and sensors to the controller 200 corresponding to the stator 110. In this manner, the controller 200 can control conduction of the magnetic coil wound around the magnetic core 111a of the corresponding stator 110.

Further, a sub-connector 116 is formed on both sides in the X-direction of each of the substrates 112A, 112B, 112C, and 112D in order to electrically connect the respective substrates 112A, 112B, 112C, and 112D. A harness 117 embodied as a flat cable or the like is connected to the sub-connector 116. The harness 117 electrically connects the adjacent substrates (i.e., combination of the substrate 112A and the substrate 112D of the unit frame 101 on the one end of the substrate 112A; the substrates 112A and 112B; the substrates 112B and 112C; the substrates 112C and 112D; and the substrate 112D and the substrate 112A of the unit frame 101 adjacent to the other end side of the substrate 112D, the same hereinbelow).

In the illustrated embodiment, the substrates 112A, 112B, 112C, and 112D are an example of a sensor substrate of the present disclosure.

Referring to FIGS. 3 and 4, the slider 30 comprises a sliding member 31 that is fitted on the rail 103, a top plate 32 attached to an upper portion of the sliding member 31, and a plurality of permanent magnets 33 as movers that are fixed to a bottom surface of the top plate 32 so as to face the stators 110.

In the illustrated embodiment, a groove that extends in the X-direction is formed in both side portions of the rail 103 as illustrated in FIG. 3. The sliding member 31 has a recess portion that has inner walls which are covered by the upper portion of the rail 103 and make sliding contact with the grooves on both side portions. When the recess portion is introduced to the end portion of the rail 103, the sliding member 31 is connected to the rail 103 so that the sliding member 31 can slide only in the longitudinal direction of the rail 103 in a state where the sliding member 31 can be inserted and removed in the X-direction.

The top plate 32 is a structure that moves integrally with the sliding member 31. The top plate 32 functions as a component for attaching a pallet, for example. A work as a conveying article conveyed by the linear conveyance device 10 is mounted on the pallet. Naturally, the top plate 32 itself may be processed so that a work is mounted directly on the top plate 32.

The plurality of permanent magnets 33 as movers are arranged in a line at a predetermined arrangement pitch along the X-direction so that N and S polarities alternately appear on the lower end surface. On the other hand, the magnetic polarity of the magnetic electromagnet 111 of the stator 110 changes according to the phase of the current supplied to the magnetic coil. The controller 20 supplies a current of any one of different phases u, v, and w to the magnetic coil. When the current is supplied, a magnetic flux occurring in the magnetic electromagnet 111 and a magnetic flux occurring in the permanent magnet 33 react according to a change in the magnetic polarity of the magnetic electromagnet 111, and attractive force or repulsive force can be generated between the magnetic electromagnet 111 of the stator 110 and the permanent magnet 33 of the slider 30. Thus, by controlling conduction of the magnetic coil of the magnetic electromagnet 111 when the slider 30 moves, the controller 200 can allow the slider 30 to reciprocate along the X-direction at a predetermined speed.

A front end wall 34 is fixed to a bottom surface on the front end side of the top plate of the slider 30. Two linear scales (magnetic scales) S1 and S2 included in a position detecting device S are attached to a rear surface (a surface facing the substrates 112A, 112B, 112C, and 112D) of the front end wall 34. The position detecting device S is a unit that includes "a position detecting unit" of the present disclosure.

Hereinafter, the position detecting device S of the present embodiment will be described.

Figure 5:
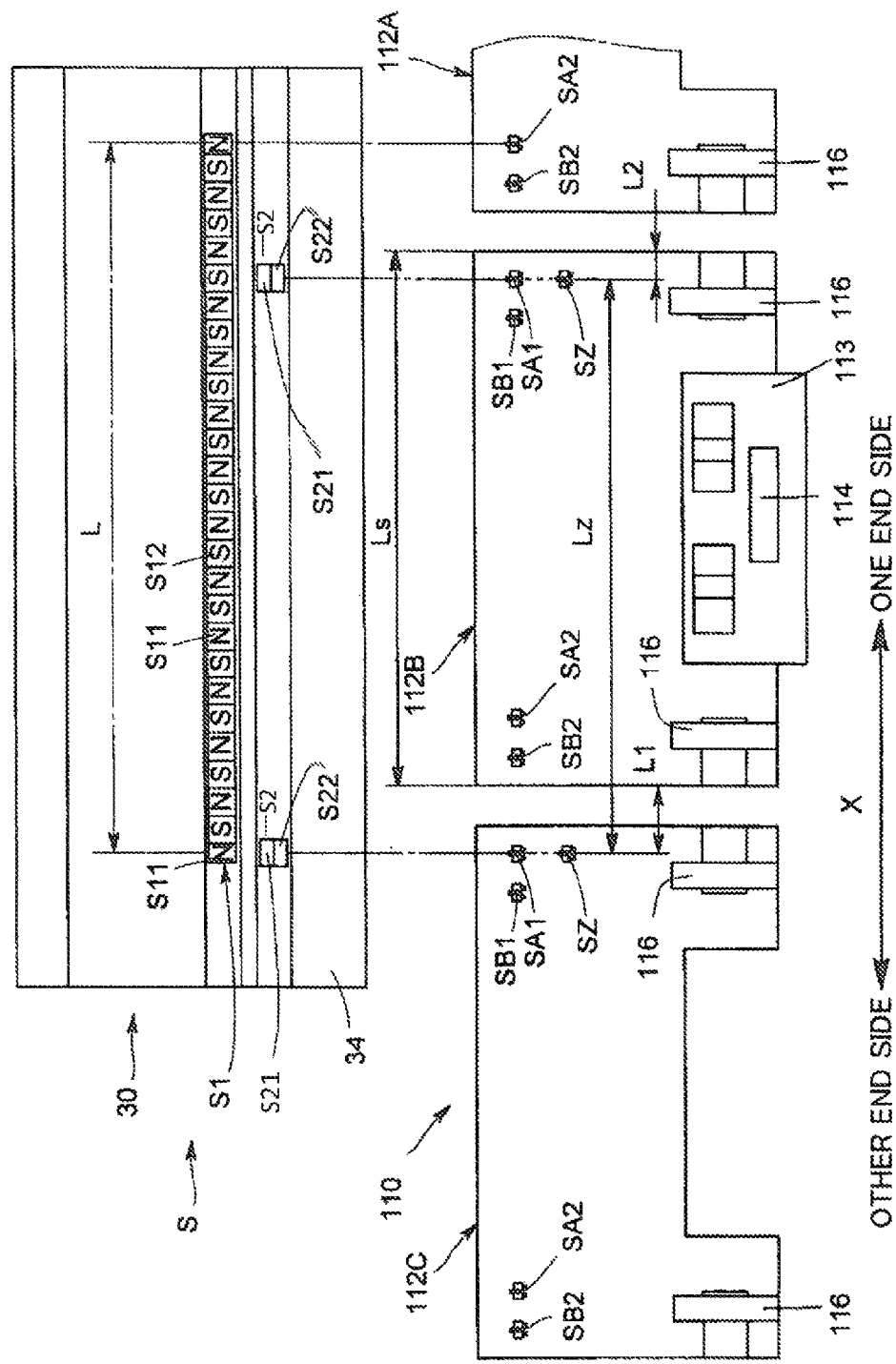
FIG. 5 is a diagram for describing a schematic configuration of a linear scale and sensors of a linear motor according to the embodiment of FIG. 1.

First, referring to FIGS. 4 and 5, the magnetic scales S1 and S2 are arranged vertically so as to extend in parallel along the X-direction. (in the drawing, the substrates 112A, 112B, 112C, and 112D are seen from the left side of FIG. 3, that is, the front side in the Y-direction and the magnetic scales S1 and S2 are depicted by a solid line when seen through from the left side of FIG. 3)

The magnetic scale S1 provided on the upper side comprises a plurality of permanent magnets S11 and S12. The permanent magnets S11 and S12 are attached to the rear surface of the front end wall 34 at an equal pitch along the X-direction so that different magnetic polarities appear alternately. In one permanent magnet S11, a magnetic polarity of an end surface close to the substrate 112A (112B, 112C, or 112D) in the Y-direction is N-polarity. In the other permanent magnet S12, a magnetic polarity of an end surface close to the substrate 112A (112B, 112C, or 112D) in the Y-direction is S-polarity. These permanent magnets S11 and S12 are arranged at an equal arrangement pitch within a predetermined scale length L. The scale length L is larger than the length (approximately the same length Ls as the length Ls of the stator 110) of the substrate 112A (112B, 112C, or 112D). In the present embodiment, both ends of the magnetic scale S1 are constituted by the permanent magnet S11 having the same magnetic polarity. In the illustrated example, although both ends of the magnetic scale S1 is constituted by the permanent magnet S11 having the N-polarity (the magnetic polarity of the end surface close to the substrate 112A (112B, 112C, or 112D) in the Y-direction is N-polarity), both ends of the magnetic scale S1 may be constituted by the permanent magnet S12 having the S-polarity.

Moreover, the magnetic scale S2 on the lower side is constituted by two sets of permanent magnets S21 and S22 attached so as to be aligned vertically. In the permanent magnets S21 and S22 that constitute each set, the magnetic polarities of the end surfaces close to the substrate 112A (112B) are different. One set of permanent magnets S21 and S22 is disposed immediately below an end on the other end side of the magnetic scale S1 on the upper side. Moreover, the other set of permanent magnets S21 and S22 is further separated toward the one end side than one set of permanent magnets. The length Lz between one set of permanent magnets S21 and S22 and the other set of permanent magnets S21 and S22 is set to be larger by a predetermined dimension than the length Ls in the X-direction of the stator 110.

In order to detect the magnetic scale S1, a pair of first sensors SA1 and SA2 that outputs a sine wave signal (A-phase) and a pair of second sensors SB1 and SB2 that outputs a cosine wave signal (B-phase) are provided in the substrates 112A, 112B, 112C, and 112D. The relation of sine and cosine waves is optional. That is, the A-phase may be a cosine wave and the B-phase may be a sine wave. Further, in order to detect the magnetic scale S2, a third sensor SZ that outputs a Z-phase signal (Z-phase) is provided in the substrates 112A, 112B, 112C, and 112D. The sensors SA1 to SZ are constituted by a hall sensor, for example, and are configured to measure magnetic flux density of the corresponding permanent magnets S11, S12, S21, and S22 and output a wave signal of an output voltage (amplitude) corresponding to the magnetic flux density.

The first sensors SA1 and SA2 are arranged on the corresponding substrate 112A (112B, 112C, or 112D) so that the first sensors SA1 and SA2 are separated toward one end side and the other end side on the same line extending along the X-direction. The height of both first sensors SA1 and SA2 is set to such a position that the first sensors SA1 and SA2 face the magnetic scale S1 in the Y-direction during assembling. Moreover, during assembling, the first sensors SA1 and SA2 face the permanent magnets S11 and S12 with a small distance in the Y-direction (front-rear direction) in relation to the magnetic scale S1. Similarly, the second sensors SB1 and SB2 are arranged on the substrate 112A (112B, 112C, or 112D) so that the second sensors SB1 and SB2 are separated toward one end side and the other end side on a line extending in the X-direction. The height of both second sensors SB1 and SB2 is set to such a position that the second sensors SB1 and SB2 face the magnetic scale S1 in the Y-direction during assembling. Moreover, during assembling, the second sensors SB1 and SB2 face the permanent magnets S11 and S12 with a small distance in the Y-direction (front-rear direction) in relation to the magnetic scale S1.

The distance in the X-direction between one first sensor SA1 and the other first sensor SA2 is set in association with the adjacent substrates 112A, 112B, 112C, and 112D. That is, the distance between the first sensor SA2 disposed on the other end side of the substrate 112A on one end side of one substrate 112B and the first substrate SA1 disposed on one end side of the substrate 112C on the other end side of the substrate 112B is set to be the same as the scale length L. Thus, both first sensors SA2 and SA1 face both ends of the magnetic scale S1 with the substrate 112B interposed.

The same is true for the distance in the X-direction between one second sensor SB1 and the other second sensor SB2. That is, the distance between the second sensor SB2 disposed on the other end side of the substrate 112A on one end side of one substrate 112B and the second sensor SB1 disposed on one end side of the substrate 112C on the other end side of the substrate 112B is set to be the same as the scale length L. Thus, both second sensors SB2 and SB1 simultaneously face both ends of the magnetic scale S1 with the substrate 112B interposed.

Further, the first sensors SA1 and SA2 and the second sensors SB1 and SB2 are set so that the sensors face permanent magnets S12 (S11) having different magnetic polarities at the same points in time.

The arrangement pitches of the first and second sensors SA1 and SB1 and the first and second sensors SA2 and SB2 are set to be ½ or 3/2 of the arrangement pitch of the two adjacent permanent magnets S11 (S12) and S12 (S11) or one that is a multiplication of an addition of an integer multiple of 2 and the arrangement pitch.

Alternatively, when n is an integer of 0 or more, the arrangement pitches are set to one that is a multiplication of an addition of $\{n\pm(\frac{1}{2})\}$ and the arrangement pitch. As a result, the A-phase wave signal and the B-phase wave signal are in such a relation that one (for example, the A-phase) is a sine wave and the other (for example, the B-phase) is a cosine wave. Thus, the phases of the wave signals output by the first sensors SA1 and SA2 and the second sensors SB1 and SB2 are shifted by $\pi/2$.

Both wave signals basically have the same amplitude and are output at the same frequency except that the phases are different. However, the width in the X-direction of the permanent magnets S11 at both ends of the magnetic scale S1 is set to be ½ of the width of the remaining permanent magnets S11 and S12. For this reason, magnetic flux density decreases at both ends of the magnetic scale S1. Thus, the amplitude of the wave signals output by the first sensors SA1 and SA2 at the point in time when the first sensors SA1 and SA2 face the permanent magnets S11 at both ends of the magnetic scale S1 is ½ of the amplitude of the wave signals output by the first sensors SA1 and SA2 at the point in time when the first sensors SA1 and SA2 face the permanent magnets S11 having the same polarities except at both ends of the scale S1. The same is true for the amplitude of the wave signals output at the points in time when the second sensors SB1 and SB2 face the permanent magnets S11 having the same polarities at both ends of the magnetic scale S1. Thus, even when the first sensors SA1 and SA2 simultaneously face both ends of the magnetic scale S1, it is possible to prevent the combined wave signal from having a larger amplitude than the wave signal when the other portions are detected.

The arrangement pitch which is the distance between an edge of the permanent magnet S11 at the end and the center in the X-direction of the adjacent permanent magnet S12 is set to be the same as the arrangement pitch of another two adjacent permanent magnets S11 and S12.

Referring to FIG. 5, the third sensor SZ is provided in each substrate 112A (112B, 112C, or 112D). Specifically, the third sensor SZ is mounted at a position close to one end side of the stator 110. For this reason, in the illustrated example, the third sensor SZ is positioned at the same position in the X-direction as the first sensor SA1 on one end side and the two sensors are provided vertically in the drawing. Moreover, a length Lz between the adjacent third sensors SZ (for example, the length Lz between the third sensor SZ of the substrate 112B and the third sensor SZ of one substrate 112C (112D) adjacent to the substrate 112B) is the same as the length Ls in the X-direction of the stator 110. Further, suppose a length in the X-direction from the other end of one substrate 112B to the third sensor SZ of the substrate 112C adjacent to the other end side is an offset amount L1, and a length in the X-direction from one end of the substrate 112B to the third sensor SZ of the substrate 112B is an offset amount L2, both offset amounts L1 and L2 are set as small as possible. As for the length Lz of the third sensors SZ and the offset amounts L1 and L2 on both ends, the same is true for the substrates 112B, 112C, and 112D.

Since the first sensor SA1 on one end side is positioned at the same position in the X-direction as the third sensor SZ disposed below the first sensor SA1, the length between the first sensors SA1 of the adjacent substrates (for example, 112A and 112B) is equal to Lz.

Figure 6:
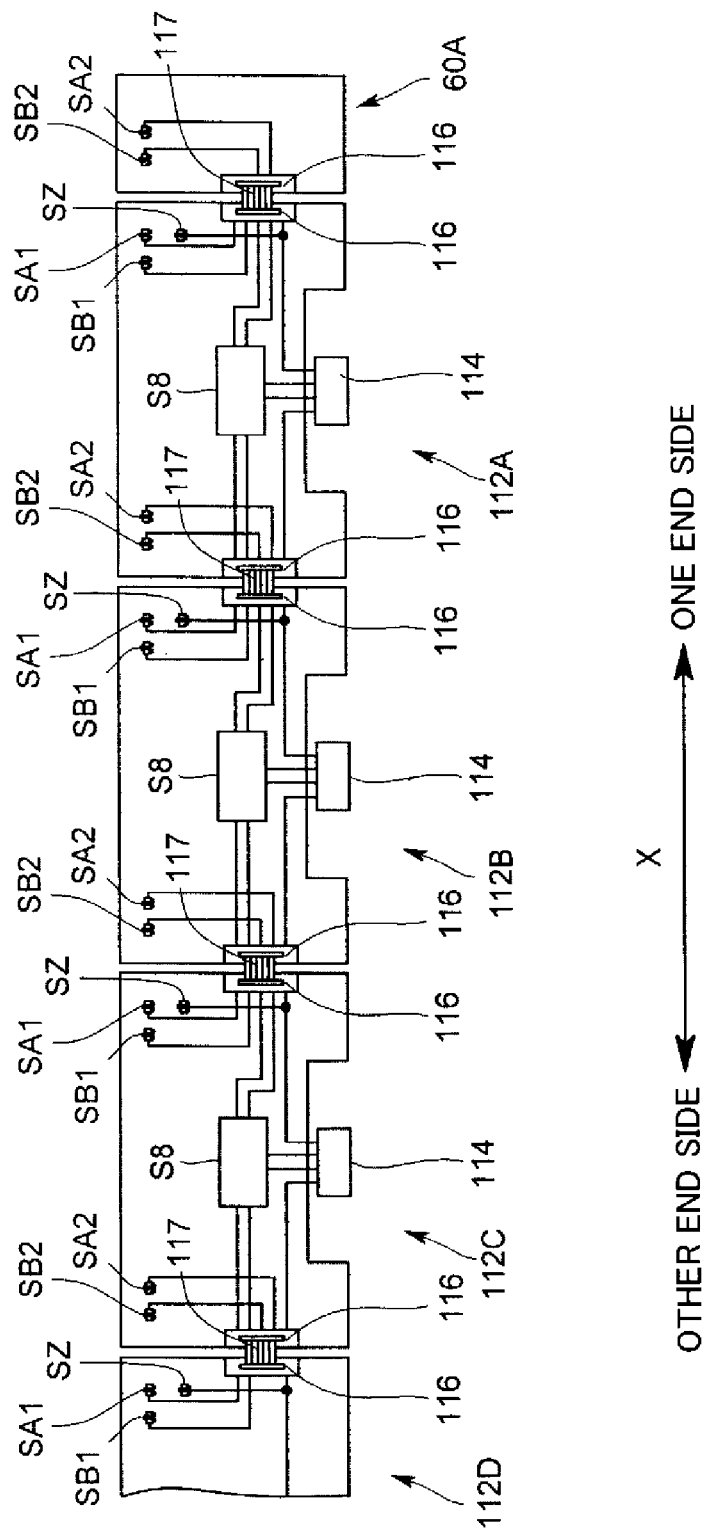
FIG. 6 is a circuit diagram illustrating a circuit configuration of a plurality of sensor substrates and sensor portions on one end side according to the embodiment of FIG. 1.

Referring to FIG. 6, each of the substrates 112A, 112B, 112C, and 112D comprises an adder circuit S8.

Hereinafter, the adder circuit S8 will be described focusing on the substrate 112B at the center of FIG. 6.

The adder circuit S8 adds the wave signal that the first sensor SA2 provided on the other end side of the substrate 112A adjacent to one end side of one substrate 112B outputs through the harness 117 and the wave signal that the first sensor SA1 provided on one end side of the substrate 112C adjacent to the other end side of the substrate 112B outputs through the harness 117 and outputs the addition signal to the connector 114. The adder circuit S8 adds the wave signal that the second sensor SB2 provided on the other end side of the substrate 112A adjacent to one end side of one substrate 112B outputs through the harness 117 and the wave signal that the second substrate SB1 provided on one end side of the substrate 112C adjacent to the other end side of the substrate 112B outputs through the harness 117 and outputs the addition signal to the connector 114.

In addition to the wave signal from the adder circuit S8, the connector 114 receives a Z-phase signal from the third sensor SZ provided on the one substrate 112B and a Z-phase signal from the third sensor SZ of the substrate 112C adjacent to the other end side of the one substrate 112B through the harness 117. Thus, the controller 200 receives an A-phase wave signal and a B-phase wave signal detected on both sides of one substrate 112B, a Z-phase signal detected by the third sensor SZ of the substrate 112B, and a Z-phase signal detected by the third sensor SZ of the substrate 112C on the other end side of the substrate 112B through the wire harness 115 connected to the connector 114.

For example, in the linear driving unit 20A on the forward path side, the slider 30 moves from one end side to the other end side. In this case, the A-phase wave signal from the first sensor SA2 on the other end side of the substrate 112A adjacent to one end side and the B-phase wave signal from the second sensor SB2 are input to the adder circuit S8 of the substrate 112B, for example. The adder circuit S8 adds these wave signals by each of the A-phases and each of the B-phases and outputs respective addition signals. These addition signals are input to the controller 200 of the substrate 112B through the wire harness 115. On the other hand, the output from the first and second sensors SA1 and SB1 to the controller 200 of the substrate 112B is 0 until the slider 30 reaches the first sensor SA1 on one end side of the substrate 112C adjacent to the other end side.

When the slider 30 moves further to the other end side, the third sensor SZ of the substrate 112B detects one set of permanent magnets S21 and S22 on the other end side of the magnetic scale S2 and outputs a Z-phase signal. These output signals are input to the controller 200 of the substrate 112B. Moreover, the controller 200 of the substrate 112B counts a change in the amplitude of the A- and B-phase wave signals from the substrate 112A adjacent to one end side after the point in time when the magnetic scale S2 on the other end side passes through the third sensor SZ. Based on this signal, the controller 200 of the substrate 112B can obtain the position of the slider 30 relative to the origin position.

When the slider 30 moves further toward the other end side, the permanent magnet S11 on one end side of the magnetic scale S1 reaches the first sensor SA2 on the other end side of the substrate 112A. At the same time, the permanent magnet S11 on the other end side of the magnetic scale S1 reaches the first sensor SA1 on one end side of the substrate 112C. At this point in time, the A-phase wave signal having ½ amplitude output from the first sensor SA2 on the other end side of the substrate 112A and the A-phase wave signal of ½ amplitude output from the first sensor SA1 on one end side of the substrate 112C are input to the adder circuit S8 of the substrate 112B. On the other hand, the adder circuit S8 adds the A-phase wave signal of ½ amplitude output from the first sensor SA2 on the other end side of the substrate 112A and the A-phase wave signal of ½ amplitude output from the first sensor SA1 on one end side of the substrate 112C. Moreover, the adder circuit S8 outputs an A-phase wave signal of 2/2 amplitude. Thus, the A-phase wave signal of 2/2 amplitude output from the adder circuit S8 is input to the controller 200 of the substrate 112B. Thus, the continuity is maintained between the wave signal when both substrates 112A and 112B adjacent to the substrate 112B detect an end of the magnetic scale S1 and the wave signal when only one of both substrates 112A and 112B adjacent to the substrate 112B detects the magnetic scale S1. As a result, the A-phase wave signal input to the controller 200 of the substrate 112B is processed as a series of smooth A-phase wave signals.

At a point in time when the permanent magnet S11 on the other end side of the magnetic scale S1 reaches the first sensor SA1 on one end side of the substrate 112C, the permanent magnets S21 and S22 on the other end side of the magnetic scale S2 also reach the third sensor SZ of the substrate 112C. In the subsequent point in time, similarly to the controller 200 of the substrate 112B, the controller 200 of the substrate 112C can detect the position of the slider 30 relative to the corresponding stator 110 based on detection of the third sensor SZ.

As a result, the controller 200 of the substrate 112C can detect the position of the slider 30 relative to the stator 110 based on the input A-, B-, and Z-phase signals. Therefore, the controller 200 controls the conduction of the magnetic coil of the magnetic electromagnet 111 so as to correspond to the position of the slider 30 based on a predetermined program with the aid of a main control device, and control the movement of the slider 30.

When the slider 30 moves further toward the other end side, the permanent magnet S11 on one end side of the magnetic scale S1 moves away from the first sensor SA2 on the other end side of the substrate 112A and reaches the second sensor SB2 on the other end side. At the same time, the permanent magnet S11 on the other end side of the magnetic scale S1 reaches the second sensor SB1 on one end side of the substrate 112C. At this point in time, a B-phase wave signal of ½ amplitude output from the second sensor SB2 of the substrate 112A and a B-phase wave signal of ½ amplitude output from the first sensor SB1 of the substrate 112C are input to the adder circuit S8 of the substrate 112B. On the other hand, the adder circuit S8 adds the B-phase wave signal of ½ amplitude from the second sensor SB2 on the other end side of the substrate 112A and the B-phase wave signal of ½ amplitude from the second sensor SB1 on one end side of the substrate 112C. Moreover, the adder circuit S8 outputs a B-phase wave signal of 2/2 amplitude. Thus, the B-phase wave signal of 2/2 amplitude output from the adder circuit S8 is input to the controller 200 of the substrate 112B. Therefore, continuity of the B-phase wave signal is maintained. As a result, the B-phase wave signal input to the controller 200 of the substrate 112B is processed as a series of smooth B-phase wave signals.

When the slider 30 moves further toward the other end side, the permanent magnet S11 on one end side of the magnetic scale S1 moves away from the second sensor SB2 on the other end side of the substrate 112A adjacent to one end side. Thus, the output from the first and second sensors SA2 and SB2 on the other end side of the substrate 112A is 0. On the other hand, the permanent magnets S11 and S12 on the other end side of the magnetic scale S1 continuously face the first and second sensors SA1 and SB1 on one end side of the substrate 112C adjacent to the other end side. Thus, the A-phase wave signal of 2/2 amplitude and the B-phase wave signal of 2/2 amplitude are output from the first and second sensors SA1 and SB1, respectively. These A- and B-phase wave signals are added to the output from the first and second sensors SA2 and SB2 on the other end side of the substrate 112A by the adder circuit S8 of the substrate 112B and are input to the controller 200 of the substrate 112B. The input wave signals of the respective A- and B-phases are added to the A- and B-phase wave signals that have already been input to the controller 200. Here, the added A- and B-phase wave signals are wave signals of 2/2 amplitude. Thus, continuity between these A- and B-phase wave signals and the respective signals that have already been input is secured. The controller 200 of the substrate 112B can detect the position of the slider 30 relative to the stator 110 to which the substrate 112B is attached by counting the respective wave signals after the adding.

In this manner, the controller 200 of one substrate (for example, 112B) can detect the position of the slider 30 in a longer stroke range in the X-direction than the stator 110 using the output of the sensors on the substrates disposed on both sides of the substrate 112B. Moreover, when a certain substrate is positioned at an end of the unit frame 101, the output of the sensors on the substrate of the unit frame 101 adjacent to the unit frame 101 can be output.

In the present embodiment, the first and second sensors SA1 and SA2 on one end side are an example of an upstream-side position detecting unit of the present disclosure. On the other hand, the first and second sensors SA2 and SB2 on the other end side are an example of a downstream-side position detecting unit of the present disclosure. Moreover, in the present embodiment, the adder circuit S8 is an example of a position detection signal adding unit. The position detecting device S according to the present embodiment includes the first and second sensors SA1 and SB1 on one end side, the first and second sensors SA2 and SB2 on the other end side, the third sensor SZ, and the magnetic scales S1 and S2.

Subsequently, in the linear driving unit 20B on the backward path side, four substrates 112A, 112B, 112C, and 112D are sequentially attached to the front side in the Y-direction of the unit frame 101 in that order from one end side to the other end side so as to correspond to the four stators 110 that constitute the unit frame 101 similarly to the linear driving unit 20A on the forward path side. The plate 113 is attached to the respective substrates 112A, 112B, 112C, and 112D. The connectors 114 are disposed on the plates 113. The wire harnesses 115 for realizing wire connection to an external device are connected to the connectors 114. The wire harness 115 is disposed so as to extend toward the front side in the Y-direction of the unit frame 101.

In the linear driving unit 20B on the backward path side, the slider 30 moves from the other end side to one end side. Hereinafter, a detecting process on the backward path side will be described focusing on the substrate 112B.

For example, at a point in time when the permanent magnet S11 on one end side of the magnetic scale S1 passes through the first sensor SA1 on one end side of the substrate 112C on the upstream side of one substrate 112B, the first and second sensors SA1 and SB1 on one end side of the substrate 112C output A- and B-phase wave signals. Moreover, the third sensor SZ outputs a Z-phase signal. The A- and B-phase wave signals are input to the adder circuit S8 of the substrate 112B through the harness 117. Moreover, the Z-phase signal is input to the controller 200 of the substrate 112C and is also input to the controller 200 of the substrate 112B through the harness 117 and the wire harness 115. The adder circuit S8 outputs the A- and B-phase wave signals through the wire harness 115. The output A- and B-phase wave signals are input to the controller 200 of the substrate 112B together with the Z-phase signal output from the third sensor SZ of the substrate 112C. After that, the A-, B-, and Z-phase signals are input to the controller 200 of the substrate 112B until the slider 30 reaches the substrate 112A and the magnetic scale S1 passes through the first sensor SA1 (thus, the third sensor SZ of the substrate 112B) on one end side of the substrate 112B similarly to the linear driving unit 20A on the forward moving side.

The controller 200 of the substrate 112B counts a change in the amplitude of the A-phase wave signal from the first sensor SA1 on one end side of the substrate 112C and the B-phase wave signal from the second sensor SB1 after one set of permanent magnets S21 and S22 on one end side of the magnetic scale S2 reaches the third sensor SZ of the substrate 112C. Based on this signal processing, the controller 200 of the substrate 112B can detect the position of the slider 30. At this point in time, any one of the permanent magnets S11 and S12 of the magnetic scale S1 does not reach the first and second sensors SA2 and SB2 on the other end side of the substrate 112A on one end side. Thus, the wave signals having 2/2 amplitude of the sensors SA1 and SB1 on one end side of the substrate 112C are input to the substrate 112B.

At a point in time when the slider 30 moves further from the other end side to one end side and the permanent magnet S11 on one end side of the magnetic scale S1 reaches the second sensor SB2 on the other end side of the substrate 112A, the permanent magnet S11 on the other end side of the magnetic scale S1 reaches the second sensor SB1 on one end side of the substrate 112C. Thus, the B-phase wave signal having ½ amplitude from the second sensor SB2 on the other end side of the substrate 112A and the B-phase wave signal having ½ amplitude from the second sensor SB1 on one end side of the substrate 112C are input to the adder circuit S8 of the substrate 112B through the corresponding harness 117. The adder circuit S8 adds these B-phase wave signals and outputs an addition signal having 2/2 amplitude. The output addition signal is input to the controller 200 of the substrate 112B. The addition signal having 2/2 amplitude input to the controller 200 is added to the B-phase wave signal that has been output from the second sensor SB1 on one end side of the substrate 112C adjacent to the other end side. The added addition signal is smoothly continuous to the previous wave signal.

Similarly, at a point in time when the permanent magnet S11 on one end side of the magnetic scale S1 reaches the first sensor SA2 on the other end side of the substrate 112A, the permanent magnet S11 on the other end side of the magnetic scale S1 reaches the first sensor SA1 on one end side of the substrate 112C. Thus, the A-phase wave signal having ½ amplitude from the first sensor SA2 on the other end side of the substrate 112A and the A-phase wave signal having ½ amplitude from the first sensor SA1 on one end side of the substrate 112C are input to the adder circuit S8 of the substrate 112B through the corresponding harness 117. The adder circuit S8 adds these A-phase wave signals and outputs an addition signal having 2/2 amplitude. The output addition signal is input to the controller 200 of the substrate 112B. The addition signal having 2/2 amplitude input to the controller 200 is added to the A-phase wave signal that has been output from the first sensor SA1 on one end side of the substrate 112C adjacent to the other end side. The added addition signal is smoothly continuous to the previous wave signal. Further, at a point in time when the permanent magnet S11 on one end side of the magnetic scale S1 reaches the first sensor SA2 on the other end side of the substrate 112A, one set of permanent magnets S21 and S22 on one end side of the magnetic scale S2 is detected by the third sensor SZ of the substrate 112B. Moreover, at this point in time, one set of permanent magnets S21 and S22 on the other end side of the magnetic scale S2 is detected by the third sensor SZ of the substrate 112C. Thus, even in the course of processes in which one set of permanent magnets S21 and S22 on one end side of the magnetic scale S2 passes through the substrate 112C and is detected by the third sensor SZ of the substrate 112B, an origin signal is output so as to correspond to the length Lz. As a result, the controller 200 of the substrate 112B can accurately compute the position of the slider 30 without losing origin information.

As a result, the controller 200 of the substrate 112B detects the position of the slider 30 relative to the stator 110 based on the input A-, B-, and Z-phase signals, controls conduction of the magnetic coil of the magnetic electromagnet 111 based on a predetermined program with the aid of a main control device, and controls the movement of the slider 30.

Next, referring to FIG. 1, the first circulating device 40 of the linear conveyance device 10 comprises a conveying unit 41, a driving unit 42, a slider conveying unit 43, and a slider conveying unit 44.

The conveying unit 41 is a unit that can reciprocate in the Y-direction on the other end side of the linear driving unit 20A on the forward path side and the linear driving unit 20B on the backward path side. A reception position of the slider 30 is set at the downstream end on the other end side of the linear driving unit 20A on the forward path side. Moreover, a transfer position at which the slider 30 is transferred to the other end side of the linear driving unit 20B on the backward path side is set at the upstream end on the other end side of the linear driving unit 20B on the backward path side. At the reception position, the slider 30 is received in the conveying unit 41 from the other end side of the linear driving unit 20A of the forward path side. At the transfer position, the slider 30 is transferred from the conveying unit 41 to the other end side of the linear driving unit 20B on the backward path side without changing its attitude.

The driving unit 42 is a unit that drives the conveying unit 41 between the reception position and the transfer position.

The slider conveying unit 43 can engage with and disengage from the slider 30. The slider conveying unit 43 engages with the slider 30 positioned in the linear driving unit 20A on the forward path side and conveys the engaged slider 30 to the reception position. When the conveying unit 41 waits at the reception position, the slider conveying unit 43 conveys the slider 30 to the reception position from the downstream end of the linear driving unit 20A. In this way, the slider 30 is received on the conveying unit 41 without changing its posture. After that, the driving unit 42 conveys the conveying unit 41 from the reception position to the transfer position.

The slider conveying unit 44 can engage with and disengage from the slider 30. The slider conveying unit 44 engages with the slider 30 positioned on the conveying unit 41 having arrived at the transfer position and conveys the engaged slider 30 to the upstream end of the linear driving unit 20B. When the conveying unit 41 arrives at the transfer position, the slider conveying unit 44 conveys the slider 30 from the conveying unit 41 to the other end side of the linear driving unit 20B on the backward path side. In this way, the slider 30 is transferred to the other end side of the linear driving unit 20B on the backward path side without changing its posture.

In this manner, in the present embodiment, the slider 30 conveyed from the linear driving unit 20A on the forward path side can be circulated to the linear driving unit 20B on the backward path side while maintaining the same posture.

Next, the second circulating device 50 comprises a conveying unit 51, a driving unit 52, a slider conveying unit 53, and a slider conveying unit 54.

The conveying unit 51 is a unit that can reciprocate in the Y-direction on one end side of the linear driving unit 20B on the backward path side and the linear driving unit 20A on the forward path side. A reception position of the slider 30 is set at the downstream end on one end side of the linear driving unit 20B on the backward path side. Moreover, a transfer position at which the slider 30 is transferred to one end side of the linear driving unit 20A on the forward path side is set at the upstream end on one end side of the linear driving unit 20A on the forward path side. At the reception position, the slider 30 is received in the conveying unit 51 from one end side of the linear driving unit 20B on the backward path side. At the transfer position, the slider 30 is transferred from the conveying unit 51 to one end side of the linear driving unit 20A on the forward path side without changing its posture.

The driving unit 52 is a unit that drives the conveying unit 51 between the reception position and the transfer position.

The slider conveying unit 53 can engage with and disengage from the slider 30. The slider conveying unit 53 engages with the slider 30 positioned in the linear driving unit 20B on the backward path side and conveys the engaged slider 30 to the reception position. When the conveying unit 51 waits at the reception position, the slider conveying unit 53 conveys the slider 30 to the reception position from the downstream end of the linear driving unit 20B. In this way, the slider 30 is received on the conveying unit 51 without changing its posture. After that, the driving unit 52 conveys the conveying unit 51 from the reception position to the transfer position.

The slider conveying unit 54 can engage with and disengage from the slider 30. The slider conveying unit 54 engages with the slider 30 positioned in the conveying unit 51 having arrived at the transfer position and conveys the engaged slider 30 to the upstream end of the linear driving unit 20A. When the conveying unit 51 arrives at the transfer position, the slider conveying unit 54 conveys the slider 30 from the conveying unit 51 to one end side of the linear driving unit 20A on the forward path side. In this way, the slider 30 is transferred to one end side of the linear driving unit 20A on the forward path side without changing its posture.

In this manner, in the present embodiment, the slider 30 conveyed from the linear driving unit 20B on the backward path side can be circulated to the linear driving unit 20A on the forward path side while maintaining the same posture. At the transfer position of the second circulating device 50, an operator can arbitrarily introduce the slider 30 to the linear driving unit 20A on the forward path side. The number of sliders 30 introduced simultaneously to the linear driving units 20A and 20B can be optionally set within a range where overflow does not occur.

The linear conveyance device 10 comprises a plurality of linear motors (the linear driving unit 20A on the forward path side and the linear driving unit 20B on the backward path side) and a circulating device that circulates the slider from the other end of the linear motors to one end of the adjacent linear motor. The plurality of linear motors and the plurality of circulating devices form a circulation path of the slider so that one or more sliders moves to the circulation path.

Here, in the illustrated embodiment, a one-end-side sensor substrate 60A as an auxiliary sensor substrate is provided in the second circulating device 50 of each of the linear driving units 20A and 20B. Moreover, an other-end-side sensor substrate 61A as an auxiliary sensor substrate is provided in the first circulating device 40 of each of the linear driving units 20A and 20B.

In the second circulating device 50, the one-end-side sensor substrate 60A is disposed to be adjacent to the upstream side of the substrate 112A of the stator 110 that forms the upstream end of the linear driving unit 20A on the forward path side and the downstream side of the substrate 112A of the stator 110 that forms the downstream end of the linear driving unit 20B on the backward path side.

Similarly, in the first circulating device 40, the other-end-side sensor substrate 61A is disposed to be adjacent to the downstream side of the substrate 112D of the stator 110 that forms the downstream end of the linear driving unit 20A on the forward path side and the upstream side of the substrate 112D of the stator 110 that forms the upstream end of the linear driving unit 20B on the backward path side.

Referring to FIG. 6, the first sensor SA2 and the second sensor SB2 are provided on the one-end-side sensor substrates 60A of the linear driving unit 20A on the forward path side and the linear driving unit 20B on the backward path side. Moreover, the sub-connector 116 is provided on the other end side of the one-end-side sensor substrate 60A. The harness 117 is connected to the sub-connector 116. The one-end-side sensor substrates 60A and the substrates 112A adjacent to one-end-side sensor substrates 60A on one end side are connected by the harnesses 117.

Moreover, the controller 200 connected to the substrate 112A adjacent to the downstream side of the one-end-side sensor substrates 60A receives an addition signal between the A-phase wave signal from the first sensor SA1 provided in the substrate 112B and the A-phase wave signal from the first sensor SA2 provided in the one-end-side sensor substrate 60A. Moreover, the controller 200 connected to the substrate 112A receives an addition signal between the B-phase wave signal from the second sensor SB1 provided in the substrate 112B and the B-phase wave signal from the second sensor SB2 provided in the one-end-side sensor substrate 60A. Further, the controller 200 connected to the substrate 112A receives the Z-phase signal from the third sensor SZ of the substrate 112A. The controller 200 connected to the substrate 112A detects the position of the slider 30 relative to the stator 110 to which the substrate 112A is attached based on these signals.

Referring to FIG. 7, the first sensor SA1, the second sensor SB1, and the third sensor SZ are provided on the other-end-side sensor substrates 61A of the linear driving unit 20A on the forward path side and the linear driving unit 20B on the backward path side. The sub-connector 116 is provided on one end side of the other-end-side sensor substrate 61A. The harness 117 is connected to the sub-connector 116. The other-end-side sensor substrates 61A and the substrates 112D adjacent to the other-end-side sensor substrates 61A are connected by the harnesses 117.

Moreover, the controller 200 connected to the substrate 112D adjacent to the upstream side of other-end-side sensor substrates 61A receives an addition signal between the A-phase wave signal from the first sensor SA2 provided in the substrate 112C and the A-phase wave signal from the first sensor SA1 provided in the other-end-side sensor substrate 61A. Further, the controller 200 connected to the substrate 112D receives an addition signal between the B-phase wave signal from the second sensor SB2 provided in the substrate 112C and the B-phase wave signal from the second sensor SB1 provided in the other-end-side sensor substrate 61A. As for a Z-phase signal, in the linear driving unit 20A on the forward path side, the controller 200 connected to the substrate 112D adjacent to the upstream side of the other-end-side sensor substrate 61A detects the Z-phase signal from the third sensor SZ of the substrate 112D. In the linear driving unit 20B on the backward path side, the controller 200 connected to the substrate 112D adjacent to the downstream side of the other-end-side sensor substrate 61A detects the Z-phase signal from the third sensor SZ provided in the other-end-side sensor substrate 61A and detects the Z-phase signal from the third sensor SZ of the substrate 112D adjacent to the downstream side of the other-end-side sensor substrate 61A. Based on these Z-phase signals, the controllers 200 detect the position of the slider 30 relative to the stator 110 to which the corresponding substrate 112D is attached.

As described above, according to the linear conveyance device 10 of the present embodiment, the linear driving unit 20A on the forward path side and the linear driving unit 20B on the backward path side that drive the slider 30 in the X-direction (the direction along the moving path) each comprise a plurality of stator units 100. Each stator unit 100 comprises stators 110. Each stator 110 comprises the sensor substrates 112A to 112B. The sensor substrates 112A to 112B each comprise the adder circuit S8. The adder circuit S8 adds the position detection signals from the position detecting unit provided in the substrates 112A and 112C on both sides of one substrate 112B and outputs an addition signal. The controller 200 connected to one substrate 112B obtains the position of the slider 30 relative to the stator 110 based on the addition signal output by the adder circuit S8. Thus, the controller 200 can detect the position of the slider 30 relative to the stator 110 in a movement stroke range of the slider 30 that is longer than the length (that is, the length Ls of the stator 110) of the substrate 112B provided in the stator 110.

Further, since the substrates 112A to 112D as the plurality of sensor substrates fit within the inner side of the unit frame 101 that forms the motor body of the corresponding stator unit 100, a superfluous protruding portion will not occur. For this reason, when the stator unit 100 is a single body, it is remarkably easy to handle the stator unit 100. Moreover, when a plurality of stator units 100 are newly connected to the base 11 or the like, the connected stator unit 100 is removed, or the stator unit 100 is added to the existing linear driving units 20A and 20B, and it is not necessary to disassemble the stator unit 100 itself (that is, it is not necessary to perform an operation of attaching or detaching the substrate 112A or 112D to the unit frame 101). Thus, it is possible to obtain a linear conveyance device that has good efficiency in connecting and removing operations.

Moreover, in the present embodiment, the first sensors SA1 and SA2 and the second sensors SB1 and SB2 are provided in each of the sensor substrates 112A, 112B, 112C, and 112D as the position detecting unit. The first sensors SA1 and SA2 constitutes a set of two hall sensors, one of which is a hall sensor (the sensor SA1) disposed on one end side of the stator 110 in the X-direction and the other is a hall sensor (the sensor SA2) disposed on the other end side of the stator 110. Moreover, similarly, the second sensors SB1 and SB2 form a set of two sensors of which one is a hall sensor (the sensor SB1) disposed one end side of the stator 110 in the X-direction and the other is a hall sensor (the sensor SB2) disposed on the other end side of the stator 110. Moreover, the adder circuit S8 forms a position detection signal adding unit that adds the position detection signal from the hall sensor disposed on the other end side of the stator 110 adjacent to one end of each stator 110 in each sensor set and the position detection signal from the hall sensor disposed on one end side of the stator 110 adjacent to the other end side and outputs a continuous wave signal to each sensor set.

Thus, in the present embodiment, the stators 110 corresponding to the respective substrates 112A to 112D have the same dimensions. Thus, it is possible to detect the position of the mover in a relatively wide stroke range even if the respective substrates 112A to 112D are fixed to the unit frame 101 flush without being offset in the X-direction. Moreover, in the present embodiment, the arrangement pitch between the first sensor SA1 and the second sensor SB1 and the arrangement pitch between the first sensor SA2 and the second sensor SA2 are, for example, ½ or 3/2 of the arrangement pitch between the adjacent permanent magnets S11 and S12 of the magnetic scale S1. That is, the arrangement pitch in the X-direction of one end and the other ends of the sensors that form the two sensor sets is a multiplication of $\{n+(½)\}$ (where n is an integer of 0 or more) and the arrangement pitch of the plurality of permanent magnets S11 and S12 that constitutes the magnetic scale S1. For this reason, the wave signal output by the sensor set formed by the respective first sensors SA1 and SA2 and the wave signal output by the sensor set formed by the respective second sensors SB1 and SB2 have phases that are offset by $\pi/2$ in relation to each other. Thus, in the present embodiment, by using two sets of sensors so that one outputs a sine wave and the other outputs a cosine wave, it is possible to improve resolution and to provide a high-precision position detecting function.

Moreover, in the present embodiment, the third sensor SZ as the origin sensor is provided at a position near one end side of the stator 110 in the X-direction. For this reason, the length Ls of the stator 110 and the offset amounts L1 and L2 in the X-direction decrease as much as possible. Thus, the origin information can be obtained immediately at the point in time when the magnetic scale S1 of the slider 30 starts moving from a certain stator 110 in the stator unit 100 to a stator 110 adjacent to the stator 110 and at the point in time when the magnetic scale S1 starts moving from a certain stator unit 100 in the plurality of stator units 100 to another stator unit 100 adjacent to the stator unit 100. As a result, it is possible to detect the position of the slider 30 in a relatively long stroke range.

Moreover, in the present embodiment, the linear driving unit 20A on the forward path side comprises the one-end-side sensor substrate 60A attached to be adjacent to an end on one end side (the upstream side in the moving direction of the slider 30) and the other-end-side sensor substrate 61A attached to be adjacent to the end on the other end side. Further, the linear driving unit 20B on the backward path side comprises the one-end-side sensor substrate 60A attached to be adjacent to the end on the one end side (the downstream side in the moving direction of the slider 30) and the other-end-side sensor substrate 61B attached to be adjacent to the end on the other end side. In each one-end-side sensor substrate 60A, the first sensor SA2 and the second sensor SB2 corresponding to the other-end-side sensors of the substrates 112A, 112B, 112C, and 112D are provided. In each other-end-side sensor substrate 61A, the first sensor SA1, the second sensor SB1, and the third sensor SZ corresponding to the one-end-side sensors of the substrates 112A, 112B, 112C, and 112D are provided.

Thus, in the present embodiment, in the upstream end of the linear driving unit 20A on the forward path side, the controller 200 of the stator 110 that forms the upstream end can receive signals output from the one-end-side sensor substrate 60A as the auxiliary sensor substrate. Thus, the controller 200 can detect the positions of the sliders 30 that enter the stator 110 that forms the upstream end of the linear driving unit 20A based on the signal output from the third sensor SZ of the substrate 112A disposed on the stator 110, the signal output from the substrate 112B adjacent to the downstream side of the substrate 112A, and the signal output from the one-end-side sensor substrate 60A and control the movement of the sliders 30. Thus, when the slider 30 circulating from the second circulating device 50 enters the stator 110 on the most upstream side or when the operator disposes the slider 30 in the stator 110 on the most upstream side, the controller 200 can immediately detect the position of the slider 30 and control the movement of the slider 30.

Moreover, in the downstream end of the linear driving unit 20A on the forward path side, the controller 200 of the stator 110 that forms the downstream end can also receive signals output from the sensor substrate 61A as the auxiliary sensor substrate. Thus, the controller 200 can detect the position of the slider 30 that leaves from the end of the stator 110 that forms the downstream end of the linear driving unit 20A based on the signal output from the third sensor SZ of the substrate 112D of the stator 110, the signal output from the substrate 112C on the upstream side of the substrate 112D, and the signal output from the sensor substrate 61A and control the movement of the slider 30.

Similarly, in the upstream end of the linear driving unit 20B on the backward path side, the controller 200 of the stator 110 that forms the upstream end can also receive signals output from the other-end-side sensor substrate 61A as the auxiliary sensor substrate. Thus, the controller 200 can detect the position of the slider 30 transferred to the stator 110 that forms the upstream end of the linear driving unit 20B based on the signal output from the third sensor SZ of the substrate 112D provided in the stator 110, the signal output from the substrate 112C adjacent to the downstream side of the substrate 112D, and the signal output from the other-end-side sensor substrate 61A and control the transfer operation. Thus, when the slider 30 is transferred to the upstream end from the first circulating device 40 so that the slider 30 enters the stator 110 on the most upstream side, it is possible to immediately detect the position of the slider 30 and to control the movement of the slider 30.

Moreover, in the downstream end of the linear driving unit 20B on the backward path side, the controller 200 of the stator 110 that forms the downstream end can receive the signals from the sensor substrate 60A as the auxiliary sensor substrate. Thus, the controller 200 can detect the position of the slider 30 transferred to the second circulating device 50 from the stator 110 that forms the downstream end of the linear driving unit 20B based on the signal output from the third sensor SZ of the substrate 112A of the stator 110, the signal output from the substrate 112B adjacent to the upstream side of the substrate 112A, and the signal output from the one-end-side sensor substrate 60A and control the movement of the slider 30.

Moreover, in the present embodiment, the substrates (112A and 112B, 112B and 112C, 112C and 112D, 112D and 112A, or 60A and 112A, and 112D and 61A) arranged on both sides are electrically connected by the harness 117. In this configuration, since the substrates 112A to 112D of which the dimension in the X-direction is approximately the same as the dimension Ls in the X-direction of the stator 111 are employed, it is possible to shorten the harness 117 as much as possible. Thus, in the harness 117, there is no problem of noise superposition and it is possible to switch a differential transfer scheme to a single-end transfer scheme.

The present disclosure is not limited to the above embodiment, and naturally, various changes can be made without departing from the spirit of the present disclosure.

For example, the sensor is ideally a hall sensor, and a sensor device other than the hall sensor may also be used. The expressions such as linear or rectilinear are used for engineering reasons and are not intended to exclude a curved path.

Moreover, the linear driving unit 20A on the forward path side may be rotated by 180° as viewed from the above so as to replace the linear driving unit 20B on the forward path side of the above-described embodiment so that the linear driving unit on the forward path side has the same configuration as the linear driving unit 20A on the backward path side. In this case, the substrates 112A to 112D, the connectors 114 and 116, and the wire harnesses 115 and 117 are on the front side in the Y-direction on the forward path side and are on the rear side in the Y-direction on the backward path side. Thus, inspection and maintenance properties are improved.

In the linear motor according to the present disclosure, the position detection signal adding unit of the sensor substrate adds the position detection signal from the downstream-side position detecting unit of a sensor substrate being adjacent to an upstream side of one sensor substrate in the moving direction and the position detection signal from the upstream-side position detecting unit of a sensor substrate being adjacent to a downstream side of the one sensor substrate in the moving direction to obtain an addition signal and outputs the addition signal. For this reason, even if the sensor substrates fit within the corresponding stator, the control device can detect the position of the slider relative to the stator in a movement stroke range of the slider that is longer than the length of one stator similarly to the configuration of Japanese Patent Laid-open Publication No. 2011-101552. On the other hand, since the respective sensor substrates are attached so as to fit within the dimension of the corresponding stator, a superfluous protruding portion will not occur. Therefore, when the linear motor is constituted by a single stator unit, it is remarkably easy to handle the linear motor. Moreover, where stators or stator units are connected to a base or the like to form the linear motor, or where a linear motor constituted by connecting stators or stator units are disassembled, it is not necessary to perform an operation such as attaching or detaching the sensor substrate. Therefore, the efficiency of an operation of connecting the stators or the stator units or disassembling the linear motor is improved.

In the linear motor according to a preferred aspect, the linear motor further comprises a magnetic scale facing both the upstream-side position detecting unit and the downstream-side position detecting unit, and the magnetic scale comprises a plurality of magnets arranged at an equal pitch to the slider so that S and N magnetic polarities alternately appear along the moving direction. In this aspect, since the position of the slider relative to the one stator is detected using a scale having the length of an actual stator, it is possible to detect the position more accurately.

In the linear motor according to a preferred aspect, a length of the magnetic scale, an arrangement of the magnets, and a distance in the moving direction between the downstream-side position detecting unit and the upstream-side position detecting unit are set such that, when the downstream-side position detecting unit of the sensor substrate adjacent in the moving direction to the upstream side of the one sensor substrate faces an upstream end of the magnetic scale, the upstream-side position detecting unit of the sensor substrate adjacent in the moving direction to the downstream side of the one sensor substrate faces a downstream end of the magnetic scale, and a magnetic polarity of the upstream end of the magnetic scale and a magnetic polarity of the downstream end of the magnetic scale are the same as any one of the S and N polarities.

In this aspect, the position detection signal based on detection of the magnetic scale is simultaneously output from the sensor substrates on both sides of a certain sensor substrate. Therefore, even when the slider sequentially moves relative to stators arranged in the motor body, it is possible to continuously detect the position of the slider relative to the stators. That is, it is possible to detect the position of the mover over a wide range in the direction extending along the moving path.

In the linear motor according to a preferred aspect, the upstream-side position detecting unit and the downstream-side position detecting unit are constituted by two sensors, the positions of which in the moving direction are different from each other, and the position detection signal adding unit is configured to: add a position detection signal from a sensor on the upstream side in the moving direction of the downstream-side position detecting unit of the sensor substrate adjacent to the upstream side of the one sensor substrate in the moving direction and a position detection signal from a sensor on the upstream side in the moving direction of the upstream-side position detecting unit of the sensor substrate adjacent to the downstream side of the one sensor substrate; and add a position detection signal from a sensor on the downstream side in the moving direction of the downstream-side position detecting unit of the sensor substrate adjacent to the upstream side of the one sensor substrate in the moving direction and a position detection signal from a sensor on the downstream side in the moving direction of the upstream-side position detecting unit of the sensor substrate adjacent to the downstream side of the one sensor substrate.

In this aspect, the position detection signals from two sensors at different positions can be output as an A-phase position detection signal and a B-phase position detection signal, respectively. Further, two A-phase position detection signals output from the sensors on the upstream and downstream sides of the sensor substrate are added, and two B-phase position detection signals output from the sensors on the upstream and downstream sides of the sensor substrate are added. Therefore, even when the slider is in any of the stators arranged in the motor body, it is possible to detect the position of the slider relative to the stator more accurately. Thus, the position of the mover can be detected more accurately in a wide range in the direction extending along the moving path.

In the linear motor according to a preferred aspect, the linear motor further comprises a magnetic scale facing both the upstream-side position detecting unit and the downstream-side position detecting unit, wherein the magnetic scale comprises a plurality of magnets being arranged at an equal pitch to the slider so that S and N magnetic polarities alternately appear along the moving direction, a length of the magnetic scale, an arrangement of the magnets, and a distance in the moving direction between the downstream-side position detecting unit and the upstream-side position detecting unit are set such that: the sensor on the upstream side in the moving direction of the downstream-side position detecting unit of the sensor substrate adjacent to the upstream side of the one sensor substrate in the moving direction and the sensor on the upstream side in the moving direction of the upstream-side position detecting unit of the sensor substrate adjacent to the downstream side of the one sensor substrate face to respective downstream end magnets of the magnetic scale, or the sensor on the downstream side in the moving direction of the downstream-side position detecting unit of the sensor substrate adjacent to the upstream side of the one sensor substrate in the moving direction and the sensor on the downstream side in the moving direction of the upstream-side position detecting unit of the sensor substrate adjacent to the downstream side of the one sensor substrate face to respective downstream end magnets of the magnetic scale; and the magnetic polarity to which the downstream-side position detecting unit faces and the magnetic polarity to which the upstream-side position detecting unit are the same as any one of the S and N polarities, and an arrangement pitch in the moving direction of respective two sensors of the upstream-side position detecting unit and the downstream-side position detecting unit is ½ or 3/2 of an arrangement pitch of adjacent magnets of the magnetic scale, or a multiplication of the arrangement pitch by an integer multiple of 2 a length of the magnetic scale, an arrangement of the magnets, and a distance in the moving direction between the downstream-side position detecting unit and the upstream-side position detecting unit are set such that a magnetic polarity that the downstream-side position detecting unit and the upstream-side position detecting unit face is the same as any one of the S and N polarities, and an arrangement pitch in the moving direction of respective two sensors of the upstream-side position detecting unit and the downstream-side position detecting unit is ½ or 3/2 of an arrangement pitch of magnets adjacent to the magnetic scale or a multiplication of the arrangement pitch by an integer multiple of 2.

In this aspect, the phases of the position detection signals from the two sensors of each of the upstream-side position detecting unit and the downstream-side position detecting unit are shifted by $\pi/2$ in relation to each other, and the position of the mover can be detected more accurately.

In the linear motor according to a preferred aspect, the linear motor further comprises an origin sensor attached to each sensor substrate, the origin sensor being configured to detect the slider and output an origin signal that gives an origin position of the addition signal from the position detection signal adding unit. In this aspect, the position of the slider relative to the stator based on the origin position can be detected in a movement stroke range of the slider that is longer than the length of the substrate provided in the stator.

In the linear motor according to a preferred aspect, the origin sensor is attached to the upstream side of the sensor substrate in the moving direction. In this aspect, the origin information can be obtained immediately at the point in time when the magnetic scale of the slider starts moving from a certain stator 110 in the stator unit 100 to a stator 110 adjacent to the one stator 110. Also the origin information can be obtained immediately at the point in time when the magnetic scale starts moving from a certain stator unit in the plurality of stator units to another stator unit adjacent to the stator unit. As a result, it is possible to detect the position of the slider in a relatively long stroke range.

In the linear motor according to a preferred aspect, an auxiliary sensor substrate is further provided on an upstream side of a most-upstream-side sensor substrate attached to a most-upstream-side stator in the moving direction, a downstream-side position detecting unit is provided on an upstream side of the auxiliary sensor substrate, the downstream-side position detecting unit configured to detect an upstream end of the slider when the slider is in the most-upstream-side stator, and output a position detection signal, the position detection signal adding unit of the most-upstream-side sensor substrate is configured to add a position detection signal from the downstream-side position detecting unit of the auxiliary sensor substrate and a position detection signal from the upstream-side position detecting unit of a sensor substrate adjacent to the downstream side of the most-upstream-side sensor substrate to obtain an addition signal, and the control device is configured to detect the position of the slider relative to the most-upstream-side stator based on the addition signal output from the position detection signal adding unit of the most-upstream-side sensor substrate.

In this aspect, when the slider is in the most-upstream-side stator in the moving direction of the slider, the control device can detect the position of the slider relative to the most-upstream-side stator. Thus, it is possible to control the slider while immediately detecting the position of the slider in the most-upstream-side stator.

In the linear motor according to a preferred aspect, an auxiliary sensor substrate is further provided on a downstream side of a most-downstream-side sensor substrate attached to a most-downstream-side stator in the moving direction, an upstream-side position detecting unit is provided on an upstream side of the auxiliary sensor substrate, the upstream-side position detecting unit being configured to detect a downstream end of the slider when the slider is in the most-downstream-side stator, and output a position detection signal, the position detection signal adding unit of the most-downstream-side sensor substrate is configured to add a position detection signal from the upstream-side position detecting unit of the auxiliary sensor substrate and a position detection signal from the downstream-side position detecting unit of a sensor substrate being adjacent to the upstream side of the most-downstream-side sensor substrate to obtain an addition signal, and the control device is configured to detect the position of the slider relative to the most-downstream-side stator based on the addition signal output from the position detection signal adding unit of the most-downstream-side sensor substrate.

In this aspect, when the slider is in the most-downstream-side stator in the moving direction of the slider, the control device can detect the position of the slider relative to the most-downstream-side stator. Thus, it is possible to control the slider while immediately detecting the position of the slider in the most-downstream-side stator.

In the linear motor according to a preferred aspect, the linear motor further comprises a magnetic scale facing both the upstream-side position detecting unit and the downstream-side position detecting unit, wherein the magnetic scale comprises a plurality of magnets being arranged at an equal pitch to the slider so that S and N magnetic polarities alternately appear along the moving direction, and an arrangement pitch in the moving direction of respective two sensors of the upstream-side position detecting unit and the downstream-side position detecting unit is a multiplication of an arrangement pitch of the plurality of magnets that form the magnetic scale by $\{n+(½)\}$ (where n is an integer of 0 or more). In this aspect, the phases of the position detection signals from the two sensors of each of the upstream-side position detecting unit and the downstream-side position detecting unit are shifted by $\pi/2$ in relation to each other, and the position of the mover can be detected more accurately.

In the linear motor according to a preferred aspect, a length of the magnetic scale, an arrangement of the magnets, and a distance in the moving direction between the downstream-side position detecting unit and the upstream-side position detecting unit are set such that: when a sensor on the upstream side in the moving direction of the downstream-side position detecting unit of the sensor substrate adjacent to the upstream side of the one sensor substrate in the moving direction faces the upstream side of the magnetic scale, a sensor on the upstream side in the moving direction of the upstream-side position detecting unit of the sensor substrate adjacent to the downstream side of the one sensor substrate faces the downstream side of the magnetic scale, and a magnetic polarity of a magnet of the magnetic scale that the sensor on the upstream side in the moving direction of the downstream-side position detecting unit faces is the same as a magnetic polarity of a magnet of the magnetic scale that the sensor on the upstream side in the moving direction of the upstream-side position detecting unit faces; and when a sensor on the downstream side in the moving direction of the downstream-side position detecting unit of the sensor substrate adjacent to the upstream side of the one sensor substrate in the moving direction faces the upstream side of the magnetic scale, a sensor on the downstream side in the moving direction of the upstream-side position detecting unit of the sensor substrate adjacent to the downstream side of the one sensor substrate faces the downstream side of the magnetic scale, and the magnetic polarity of the magnet of the magnetic scale that the downstream-side position detecting unit faces is the same as the magnetic polarity of the magnet of the magnetic scale that the upstream-side position detecting unit faces. In this aspect, the position detection signal based on detection of the magnetic scale is simultaneously output from the sensor substrates on both sides of a certain sensor substrate. Therefore, even when the slider sequentially moves relative to stators arranged in the motor body, it is possible to continuously detect the position of the slider relative to the stators. That is, it is possible to detect the position of the mover over a wide range in the direction extending along the moving path. Further, the position detection signals from two sensors at different positions can be output as an A-phase position detection signal and a B-phase position detection signal, respectively. Further, two A-phase position detection signals output from the sensors on the upstream and downstream sides of the sensor substrate are added, and two B-phase position detection signals output from the sensors on the upstream and downstream sides of the sensor substrate are added. Therefore, even when the slider is in any of the stators arranged in the motor body, it is possible to detect the position of the slider relative to the stator more accurately. Thus, the position of the mover can be detected more accurately in a wide range in the direction extending along the moving path.

In the linear motor according to a preferred aspect, the magnets of the magnetic scale are arranged so that the magnetic polarities of both ends of the magnetic scale are the same, and when the sensor on the upstream side in the moving direction of the downstream-side position detecting unit of the sensor substrate adjacent to the upstream side of the one sensor substrate in the moving direction faces the upstream end of the magnetic scale, the sensor on the upstream side in the moving direction of the upstream-side position detecting unit of the sensor substrate adjacent to the downstream side of the one sensor substrate faces the downstream end of the magnetic scale. In this aspect, the length of the stator relative to the slider can be set to an ideal length as required for detecting the position of the slider relative to the slider in a movement stroke range of the slider that is longer than the length of the stator.

In the linear motor according to a preferred aspect, a plurality of stator units that comprises the motor body and the stators attached to the motor body are connected to one another. In this aspect, handling properties are improved as compared to a linear motor in which a plurality of stators is attached to one motor body and the motor body is attached to a base.

According to another aspect of the present disclosure, there is provided a linear conveyance device including the linear motor in which the linear motor is configured to allow a conveying article to be mounted on the slider.

In this aspect, when a linear motor formed by connecting stators is disassembled, or when a connection operation of adding a stator to increase the length of the linear motor, since it is not necessary to perform an operation of attaching or detaching the sensor substrate, it is possible to obtain a linear conveyance device that has good efficiency in connecting and removing operations.

In the linear conveyance device according to a preferred aspect, a plurality of linear motors are provided, a first circulating device circulates the slider from the other end of one linear motor of the plurality of linear motors to one end of an adjacent linear motor, the ends of the linear motors that are connected by a circulating device circulates the slider, a last circulating device that circulates the slider from one end of a last linear motor of N linear motors to the one end of the one linear motor is provided whereby a plurality of linear motors and a plurality of circulating devices form a circulation path of the slider, and one or more of the sliders moves to the circulation path.

For this reason, it is possible to obtain a linear conveyance device capable of circulating the slider as well as providing good efficiency in disassembling and connecting operations.

Besides this, various changes can naturally be made within the scope of the claims of the present disclosure.

INDUSTRIAL APPLICABILITY

The present disclosure can be used as a driving device such as a conveyor or the like that is used for automatically conveying articles.

The invention claimed is:

1. A linear motor including a slider having a mover, a motor body disposed in a moving path of the slider, and stators attached to the motor body, the stators being arranged along the moving path such that the stators face the mover, the linear motor being configured to move the slider along the moving path by generating attractive force between the stators and the mover, the linear motor comprising:
   a plurality of sensor substrates attached to the motor body so as to correspond to the respective stators, each of the plurality of sensor substrates being sized within a dimension of the respective stators with respect to a moving direction extending along the moving path;
   an upstream-side position detecting unit attached to each sensor substrate, the upstream-side position detecting unit being configured to detect the slider arriving at an upstream portion of each sensor substrate in the moving direction and outputting a position detection signal;
   a downstream-side position detecting unit attached to each sensor substrate, the downstream-side position detecting unit being configured to detect the slider arriving at a downstream portion of each sensor substrate in the moving direction and outputting a position detection signal;
   the position detection signal adding unit being configured to add one position detection signal from the downstream-side position detecting unit of a sensor substrate adjacent to an upstream side of the one sensor substrate in the moving direction and the position detection signal from the upstream-side position detecting unit of a sensor substrate adjacent to a downstream side of the one sensor substrate in the moving direction to obtain an addition signal, and the position detection signal adding unit being capable of outputting the addition signal; and
   corresponds based on the addition signal from the position detection signal adding unit.

2. The linear motor according to claim 1, further comprising a magnetic scale attached to the slider, the magnetic scale being configured to face both the upstream-side position detecting unit and the downstream-side position detecting unit,
   wherein
   the magnetic scale includes a plurality of magnets arranged at an equal pitch to the slider so that S and N magnetic polarities alternately appear along the moving direction.

3. The linear motor according to claim 2, wherein
   a length of the magnetic scale, an arrangement of the magnets, and a distance in the moving direction between the downstream-side position detecting unit and the upstream-side position detecting unit are set such that, when the downstream-side position detecting unit of the sensor substrate adjacent in the moving direction to the upstream side of the one sensor substrate faces an upstream end of the magnetic scale, the upstream-side position detecting unit of the sensor substrate adjacent in the moving direction to the downstream side of the one sensor substrate faces a downstream end of the magnetic scale, and a magnetic polarity of the upstream end of the magnetic scale and a magnetic polarity of the downstream end of the magnetic scale are the same as any one of the S and N polarities.

4. The linear motor according to claim 1, wherein
   the upstream-side position detecting unit and the downstream-side position detecting unit are respectively constituted by two sensors, the positions of which in the moving direction are different from each other, and
   the position detection signal adding unit is configured to:
   add a position detection signal from a sensor on the upstream side in the moving direction of the downstream-side position detecting unit of the sensor substrate adjacent to the upstream side of the one sensor substrate in the moving direction and a position detection signal from a sensor on the upstream side in the moving direction of the upstream-side position detecting unit of the sensor substrate adjacent to the downstream side of the one sensor substrate; and
   add a position detection signal from a sensor on the downstream side in the moving direction of the downstream-side position detecting unit of the sensor substrate adjacent to the upstream side of the one sensor substrate in the moving direction and a position detection signal from a sensor on the downstream side in the moving direction of the upstream-side position detecting unit of the sensor substrate adjacent to the downstream side of the one sensor substrate.

5. The linear motor according to claim 4,
   further comprising a magnetic scale attached to the slider, the magnetic scale being configured to face both the upstream-side position detecting unit and the downstream-side position detecting unit,
   wherein
   the magnetic scale includes a plurality of magnets arranged at an equal pitch in relation to the slider so that S and N magnetic polarities alternately appear along the moving direction,
   a length of the magnetic scale, an arrangement of the magnets, and a distance in the moving direction between the downstream-side position detecting unit and the upstream-side position detecting unit are set such that:
   the sensor on the upstream side in the moving direction of the downstream-side position detecting unit of the sensor substrate adjacent to the upstream side of the one sensor substrate in the moving direction and the sensor on the upstream side in the moving direction of the upstream-side position detecting unit of the sensor substrate adjacent to the downstream side of the one sensor substrate face to respective end magnets of the magnetic scale; and the magnetic polarity to which the downstream-side position detecting unit faces and the magnetic polarity to which the upstream-side position detecting unit faces are the same as any one of the S and N polarities, and unit and the downstream-side position detecting unit is a multiplication of an arrangement pitch of the plurality of magnets that form the magnetic scale by $$\{n+(\frac{1}{2})\}$$

where n is an integer of 0 or more.

6. The linear motor according to claim 1, further comprising:
an origin sensor attached to each sensor substrate, the origin sensor being configured to detect the slider and output an origin signal that gives an origin position of the addition signal from the position detection signal adding unit.

7. The linear motor according to claim 6, wherein the origin sensor is attached to the upstream side of the sensor substrate in the moving direction.

8. The linear motor according to claim 1,
wherein
an auxiliary sensor substrate is further provided on an upstream side of a most-upstream-side sensor substrate attached to a most-upstream-side stator in the moving direction,
a downstream-side position detecting unit is provided on an upstream side of the auxiliary sensor substrate, the downstream-side position detecting unit is configured to detect an upstream end of the slider when the slider is in the most-upstream-side stator, and output a position detection signal,
the position detection signal adding unit of the most-upstream-side sensor substrate is configured to add a position detection signal from the downstream-side position detecting unit of the auxiliary sensor substrate and a position detection signal from the upstream-side position detecting unit of a sensor substrate adjacent to the downstream side of the most-upstream-side sensor substrate to obtain an addition signal, and
the control device is configured to detect the position of the slider relative to the most-upstream-side stator based on the addition signal output from the position detection signal adding unit of the most-upstream-side sensor substrate.

9. The linear motor according to claim 1,
wherein
an auxiliary sensor substrate is further provided on a downstream side of a most-downstream-side sensor substrate attached to a most-downstream-side stator in the moving direction,
an upstream-side position detecting unit is provided on an upstream side of the auxiliary sensor substrate, the upstream-side position detecting unit is configured to detect a downstream end of the slider when the slider is in the most-downstream-side stator, and output a position detection signal,
the position detection signal adding unit of the most-downstream-side sensor substrate is configured to add a position detection signal from the upstream-side position detecting unit of the auxiliary sensor substrate and a position detection signal from the downstream-side position detecting unit of a sensor substrate adjacent to the upstream side of the most-downstream-side sensor substrate to obtain an addition signal, and
the control device is configured to detect the position of the slider relative to the most-downstream-side stator based on the addition signal output from the position detection signal adding unit of the most-downstream-side sensor substrate.

10. The linear motor according to claim 4,
further comprising a magnetic scale attached to the slider, the magnetic scale being configured to face both the upstream-side position detecting unit and the downstream-side position detecting unit,
wherein
the magnetic scale comprises a plurality of magnets arranged at an equal pitch to the slider so that S and N magnetic polarities alternately appear along the moving direction, and
an arrangement pitch in the moving direction of respective two sensors of the upstream-side position detecting unit and the downstream-side position detecting unit is a multiplication of an arrangement pitch of the plurality of magnets that form the magnetic scale by $$\{n+(\frac{1}{2})\}$$

where n is an integer of 0 or more.

11. The linear motor according to claim 10,
wherein
a length of the magnetic scale, an arrangement of the magnets, and a distance in the moving direction between the downstream-side position detecting unit and the upstream-side position detecting unit are set such that:
when a sensor on the upstream side in the moving direction of the downstream-side position detecting unit of the sensor substrate adjacent to the upstream side of the one sensor substrate in the moving direction faces the upstream side of the magnetic scale, a sensor on the upstream side in the moving direction of the upstream-side position detecting unit of the sensor substrate adjacent to the downstream side of the one sensor substrate faces the downstream side of the magnetic scale, and a magnetic polarity of a magnet of the magnetic scale that the sensor on the upstream side in the moving direction of the downstream-side position detecting unit faces is the same as a magnetic polarity of a magnet of the magnetic scale that the sensor on the upstream side in the moving direction of the upstream-side position detecting unit faces; and
when a sensor on the downstream side in the moving direction of the downstream-side position detecting unit of the sensor substrate adjacent to the upstream side of the one sensor substrate in the moving direction faces the upstream side of the magnetic scale, a sensor on the downstream side in the moving direction of the upstream-side position detecting unit of the sensor substrate adjacent to the downstream side of the one sensor substrate faces the downstream side of the magnetic scale, and the magnetic polarity of the magnet of the magnetic scale that the downstream-side position detecting unit faces is the same as the magnetic polarity of the magnet of the magnetic scale that the upstream-side position detecting unit faces.

12. The linear motor according to claim 11,
wherein
the magnets of the magnetic scale are arranged so that the magnetic polarities of both ends of the magnetic scale are the same, and
when the sensor on the upstream side in the moving direction of the downstream-side position detecting unit of the sensor substrate adjacent to the upstream side of the one sensor substrate in the moving direction faces the upstream end of the magnetic scale, the sensor on the upstream side in the moving direction of the upstream-side position detecting unit of the sensor substrate adjacent to the downstream side of the one sensor substrate faces the downstream end of the magnetic scale.

13. The linear motor according to claim 1, further comprising a plurality of stator units, each stator unit includes the motor body and the stators attached to the motor body, and each stator unit is connected to one another.

14. A linear conveyance device comprising:
the linear motor according to claim 1, wherein the linear motor is configured to allow a conveying article to be mounted on the slider.

15. The linear conveyance device according to claim 14, wherein one linear motor is configured to form a forward path and another linear motor is configured to form a backward path, the linear conveyance device further comprising:
a first circulating device connected to one ends of the respective linear motors; and
connected to the other end of the respective linear motors,
the first circulating device, the last circulating device, and the respective linear motors form a circulation path allowing at least one slider to circulate between the forward path and the backward path.

16. The linear motor according to claim 4,
further comprising a magnetic scale attached to the slider, the magnetic scale being configured to face both the upstream-side position detecting unit and the downstream-side position detecting unit,
wherein
the magnetic scale comprises a plurality of magnets arranged at an equal pitch in relation to the slider so that S and N magnetic polarities alternately appear along the moving direction,
a length of the magnetic scale, an arrangement of the magnets, and a distance in the moving direction between the downstream-side position detecting unit and the upstream-side position detecting unit are set such that:
the sensor on the downstream side in the moving direction of the downstream-side position detecting unit of the sensor substrate adjacent to the upstream side of the one sensor substrate in the moving direction and the sensor on the downstream side in the moving direction of the upstream-side position detecting unit of the sensor substrate adjacent to the downstream side of the one sensor substrate face to respective end magnets of the magnetic scale; and the magnetic polarity to which the downstream-side position detecting unit faces and the magnetic polarity to which the upstream-side position detecting unit faces are the same as any one of the S and N polarities, and
an arrangement pitch in the moving direction of respective two sensors of the upstream-side position detecting unit and the downstream-side position detecting unit is a multiplication of an arrangement pitch of the plurality of magnets that form the magnetic scale by
$\{n+(1/2)\}$
where n is an integer of 0 or more.